US012210303B2

(12) United States Patent
Shoji et al.

(10) Patent No.: US 12,210,303 B2
(45) Date of Patent: Jan. 28, 2025

(54) SHEET CONVEYOR AND IMAGE FORMING APPARATUS INCORPORATING THE SHEET CONVEYOR

(71) Applicants: Keitaro Shoji, Kanagawa (JP); Yasunori Ishigaya, Kanagawa (JP)

(72) Inventors: Keitaro Shoji, Kanagawa (JP); Yasunori Ishigaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/179,058

(22) Filed: Mar. 6, 2023

(65) Prior Publication Data

US 2023/0288850 A1 Sep. 14, 2023

(30) Foreign Application Priority Data

Mar. 10, 2022 (JP) ................................ 2022-037232

(51) Int. Cl.
*G03G 15/20* (2006.01)
*H05B 1/02* (2006.01)
*H05B 3/20* (2006.01)

(52) U.S. Cl.
CPC ..... *G03G 15/2042* (2013.01); *G03G 15/2039* (2013.01); *G03G 15/2053* (2013.01);
(Continued)

(58) Field of Classification Search
CPC ........... G03G 15/2039; G03G 15/2042; G03G 15/2046; G03G 15/6558;
(Continued)

(56) References Cited

U.S. PATENT DOCUMENTS 6,185,383 B1 * 2/2001 Kanari ............... G03G 15/2042 399/334
2001/0017992 A1 * 8/2001 Hayashi ............... G03G 15/205 399/68

(Continued)

FOREIGN PATENT DOCUMENTS

JP 2012-198475 10/2012
JP 2018-004929 1/2018

OTHER PUBLICATIONS

U.S. Appl. No. 17/963,195, filed Oct. 11, 2022, Yasunori Ishigaya, et al.

*Primary Examiner* — Robert B Beatty
(74) *Attorney, Agent, or Firm* — Harness, Dickey & Pierce, P.L.C.

(57) ABSTRACT

A sheet conveyor includes a heating device to heat a recording medium and a recording medium sensor to detect the recording medium. The heating device includes a heater, a first temperature sensor to detect a temperature of the heater, and a second temperature sensor to detect the temperature of the heater. The heater has a first heat-distribution amount region on one side and a second heat-distribution amount region on the other side, in a conveyance orthogonal direction with respect to a reference position. The first heat-distribution amount region is greater in heat distribution amount than the second heat-distribution amount region. The first temperature sensor is disposed farther from the reference position than the second temperature sensor in the conveyance orthogonal direction. The first temperature sensor is disposed in the second heat-distribution amount region. The recording medium sensor is disposed in the first heat-distribution amount region.

20 Claims, 21 Drawing Sheets

(52) U.S. Cl.
CPC ............. *H05B 1/0241* (2013.01); *H05B 3/20* (2013.01); *G03G 15/2028* (2013.01); *H05B 2203/037* (2013.01)

(58) Field of Classification Search
CPC .......... G03G 2215/00611; G03G 2215/00628; G03G 2215/00721; G03G 15/2053; H05B 1/0241; H05B 3/20; H05B 2203/037; H05B 2203/007; H05B 2203/005
USPC ............................ 399/69, 334, 389; 219/216
See application file for complete search history.

(56) References Cited

U.S. PATENT DOCUMENTS

2002/0018664 A1* 2/2002 Iwasaki .............. G03G 15/2039 399/69
2006/0062610 A1* 3/2006 Ito ...................... G03G 15/2042 399/328
2007/0071475 A1* 3/2007 Blair .................. G03G 15/2046 399/68
2009/0245835 A1* 10/2009 Campbell .......... G03G 15/2042 399/68
2015/0316879 A1* 11/2015 Koyama ............ G03G 15/2017 399/69
2018/0284667 A1* 10/2018 Lesaki ............... G03G 15/2039
2019/0265620 A1* 8/2019 Kadowaki .......... G03G 15/2053
2020/0192263 A1* 6/2020 Doda ..................... G03G 21/10
2021/0072683 A1* 3/2021 Yoshida ............. G03G 15/2042
2022/0043376 A1 2/2022 Shoji et al.
2022/0155712 A1 5/2022 Imada et al.
2022/0179338 A1* 6/2022 Seshita .............. G03G 15/2053
2022/0291615 A1 9/2022 Nanno et al.
2023/0010218 A1 1/2023 Shoji et al.
2023/0266699 A1* 8/2023 Shoji .................... H05B 1/0241 399/69
2023/0367252 A1* 11/2023 Matsumoto ............ B65H 5/025

* cited by examiner

SHEET CONVEYOR AND IMAGE FORMING APPARATUS INCORPORATING THE SHEET CONVEYOR

CROSS-REFERENCE TO RELATED APPLICATION

This patent application is based on and claims priority pursuant to 35 U.S.C. § 119(a) to Japanese Patent Application No. 2022-037232, filed on Mar. 10, 2022, in the Japan Patent Office, the entire disclosure of which is hereby incorporated by reference herein.

BACKGROUND

Technical Field

Embodiments of the present disclosure relate to a sheet conveyor and an image forming apparatus incorporating the sheet conveyor.

Background Art

In a fixing device as a heating device, when a heater starts heating from a state where the apparatus including the fixing device is cooled, for example, at the time of start-up of the apparatus, an end of the heater and an end of a fixing belt (rotary member) are likely to radiate heat to other members, and thus the temperatures of these members are difficult to rise.

When the fixing operation is performed when the temperature of the end of the fixing belt is not sufficiently increased, the end of the sheet that has passed through the fixing nip is not sufficiently heated, which causes a fixing failure of the image.

Further, in an image forming apparatus including a fixing device, positional deviation sometimes occurs in a conveyance orthogonal direction that is a direction orthogonal to a sheet conveyance direction in which a recording medium is conveyed due to positional deviation when a user sets a recording medium on a sheet tray or positional deviation during the conveyance of the recording medium.

For example, a typical image heating device includes a left sheet width sensor and a right sheet width sensor inside an area proximate to the boundary of both sides in the width direction of a sheet passage area of a regular size recording medium. Alternatively, such a typical heating device includes a temperature detecting element instead of the sheet width sensors. The deviation of a recording medium to either side in the width direction of the recording medium passing the sheet passage area depending on the detection state of the sheet width sensors or the temperature detecting element.

SUMMARY

Embodiments of the present disclosure described herein provide a novel sheet conveyor including a heating device to heat a recording medium being conveyed and a recording medium sensor detects the recording medium. The heating device includes a heater, a first temperature sensor, and a second temperature sensor. The heater includes a base and a heat source. The first temperature sensor detects a temperature of the heater. The second temperature sensor detects the temperature of the heater. The heater has a first heat-distribution amount region on one side in a conveyance orthogonal direction with respect to a reference position and a second heat-distribution amount region on the other side in the conveyance orthogonal direction with respect to the reference position. The conveyance orthogonal direction is orthogonal to a conveyance direction in which the recording medium is conveyed and parallel to a surface of the recording medium. The reference position is a center position in the conveyance orthogonal direction of the heat source. The first heat-distribution amount region is greater in a heat distribution amount than the second heat-distribution amount region. The first temperature sensor is disposed farther from the reference position than the second temperature sensor in the conveyance orthogonal direction. The first temperature sensor is disposed in the second heat-distribution amount region. The recording medium sensor is disposed in the first heat-distribution amount region.

Further, embodiments of the present disclosure described herein provide an image forming apparatus including the above-described heating device.

Further, embodiments of the present disclosure described herein provide a novel sheet conveyor including a heating device to heat a recording medium being conveyed and a recording medium sensor detects the recording medium. The heating device includes a heater, a first temperature sensor, and a second temperature sensor. The heater includes a base, a heat source, a rotator, and a pressure member including an elastic layer and pressing the rotator. The first temperature sensor detects a temperature of the heater. The second temperature sensor detects the temperature of the heater. The heater has a first heat-distribution amount region on one side in a conveyance orthogonal direction with respect to a reference position of the elastic layer, and a second heat-distribution amount region on the other side in the conveyance orthogonal direction with respect to the reference position of the elastic layer. The conveyance orthogonal direction is orthogonal to a conveyance direction in which the recording medium is conveyed and parallel to a surface of the recording medium. The reference position of the elastic layer is a center position in the conveyance orthogonal direction of the elastic layer. The first heat-distribution amount region is greater in a heat distribution amount than the second heat-distribution amount region. The first temperature sensor is disposed farther from the reference position of the elastic layer than the second temperature sensor in the conveyance orthogonal direction. The first temperature sensor is disposed in the second heat-distribution amount region. The recording medium sensor is disposed in the first heat-distribution amount region.

Further, embodiments of the present disclosure described herein provide an image forming apparatus including the above-described heating device.

Further, embodiments of the present disclosure described herein provide a novel sheet conveyor including a heating device to heat a recording medium being conveyed and a recording medium sensor detects the recording medium. The heating device includes a heater, a first temperature sensor, and a second temperature sensor. The heater includes a base and a heat source. The first temperature sensor detects a temperature of the heater. The second temperature sensor detects the temperature of the heater. The heater has a first heat-distribution amount region on one side in a conveyance orthogonal direction with respect to a reference position of the recording medium, and a second heat-distribution amount region on the other side in the conveyance orthogonal direction with respect to the reference position of the recording medium. The conveyance orthogonal direction is orthogonal to a conveyance direction in which the recording medium is conveyed and parallel to a surface of the recording medium. The reference position of the recording medium is a center position in the conveyance orthogonal direction of the recording medium to be conveyed. The first heat-distribution amount region is greater in a heat distribution amount than the second heat-distribution amount region. The first temperature sensor is disposed farther from the reference position of the recording medium than the second temperature sensor in the conveyance orthogonal direction. The first temperature sensor is disposed in the second heat-distribution amount region. The recording medium sensor is disposed in the first heat-distribution amount region.

Further, embodiments of the present disclosure described herein provide an image forming apparatus including the above-described heating device.

BRIEF DESCRIPTION OF THE SEVERAL VIEWS OF THE DRAWINGS

Exemplary embodiments of this disclosure will be described in detail based on the following figures, wherein.

Figure 1:
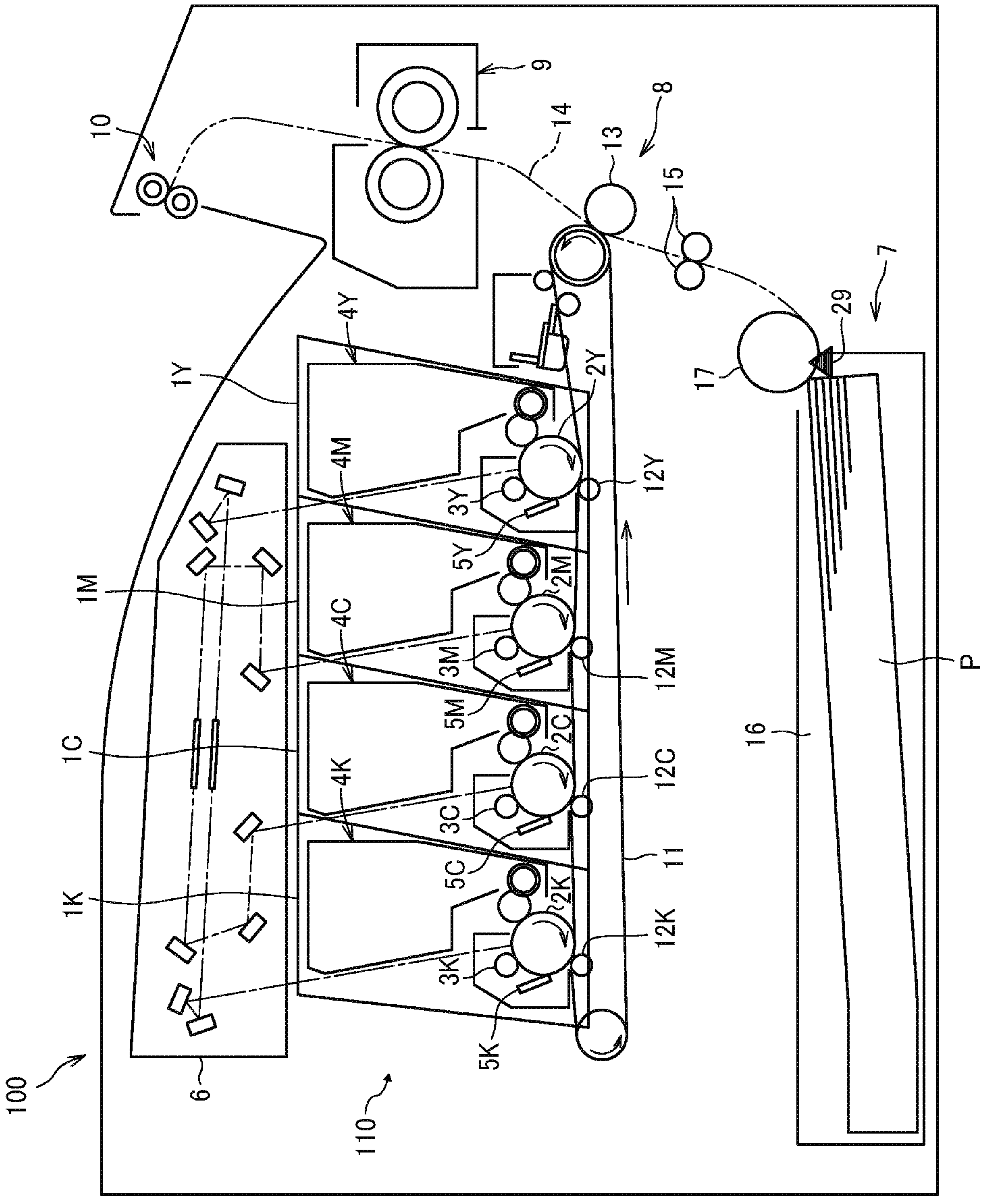
FIG. 1 is a diagram illustrating a schematic configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given of an embodiment applicable to a medium conveyor according to the present disclosure and an image forming apparatus incorporating the medium conveyor, with reference to the following figures. In the drawings, like reference signs denote line elements, and overlapping description may be simplified or omitted as appropriate. Descriptions below are given of an image forming apparatus serving as a medium conveyor according to the present disclosure, that conveys a sheet as a recording medium and forms an image on the sheet. Further, a fixing device according to an embodiment of the present disclosure serves as a heating device included in the image forming apparatus.

FIG. 1 is a diagram illustrating a schematic configuration of an image forming apparatus according to an embodiment of the present disclosure.

An image forming apparatus 100 illustrated in FIG. 1 includes four image forming units 1Y, 1M, 1C, and 1K detachably attached to a housing of the image forming apparatus 100. The image forming units 1Y, 1M, 1C, and 1K have substantially the same configuration except for containing different color developers, i.e., yellow (Y), magenta (M), cyan (C), and black (K) toners, respectively. The colors of the developers correspond to color separation components of full-color images. Each of the image forming units 1Y, 1M, 1C, and 1K includes a drum-shaped photoconductor 2 as an image bearer, a charging device 3, a developing device 4, and a cleaning device 5. The charging device 3 uniformly charges the surface of the photoconductor 2. The developing device 4 supplies the toner as the developer to the surface of the photoconductor 2 to form the toner image. The cleaning device 5 cleans the surface of the photoconductor 2.

The image forming apparatus 100 includes an exposure device 6, a sheet feeding device 7, a transfer device 8, a fixing device 9 as the heating device, and a sheet ejection device 10. The exposure device 6 exposes the surface of the photoconductor 2 to form an electrostatic latent image on the surface of the photoconductor 2. The sheet feeding device 7 serving as a recording medium feeder includes a sheet tray 16, a sheet feed roller 17, and a medium detection sensor 29. The sheet feeding device 7 supplies a sheet P as a recording medium to a sheet conveyance passage 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1K, the photoconductors 2, the charging devices 3, the exposure device 6, and the transfer device 8 are included in an image forming device 110 that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 contact the respective photoconductors 2 via the intermediate transfer belt 11. Thus, the intermediate transfer belt 11 contacts each of the photoconductors 2, forming a primary transfer nip region between the intermediate transfer belt 11 and each of the photoconductors 2.

The secondary transfer roller 13 contacts, via the intermediate transfer belt 11, one of the plurality of rollers around which the intermediate transfer belt 11 is stretched. As a result, the secondary transfer nip region is formed between the secondary transfer roller 13 and the intermediate transfer belt 11.

A timing roller pair 15 is disposed between the sheet feeding device 7 and the secondary transfer nip region, which serves as the secondary transfer roller 13 in the sheet conveyance passage 14. Pairs of rollers including the timing roller pair 15 disposed in the sheet conveyance passage 14 are conveyance members to convey the sheet P in the sheet conveyance passage 14.

Referring to FIG. 1, a description is given of the printing operations performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1K. The charging device 3 uniformly charges the surface of the photoconductor 2 at a high electric potential. Then, the exposure device 6 exposes the surface of each of the photoconductors 2 based on image data of the original document read by the document reading device or print data instructed to be printed from a terminal device. As a result, the potential of the exposed portion on the surface of each of the photoconductors 2 decreases, and an electrostatic latent image is formed on the surface of each of the photoconductors 2. The developing device 4 supplies toner to the electrostatic latent image formed on the photoconductor 2, forming a toner image.

The toner image that is formed on each of the photoconductors 2 reaches the primary transfer nip region of each of the primary transfer rollers 12 as driven to rotate by the rotation of each of the photoconductors 2. The toner images are sequentially transferred and superimposed onto the intermediate transfer belt 11 that is driven to rotate counterclockwise in FIG. 1 to form a full color toner image. Then, the full color toner image formed on the intermediate transfer belt 11 is conveyed to the secondary transfer nip region defined by the secondary transfer roller 13 along with rotation of the intermediate transfer belt 11. The full color toner image is transferred onto the sheet P conveyed to the secondary transfer nip region. The sheet P is supplied and fed from the sheet tray 16 of the sheet feeding device 7. The timing roller pair 15 temporarily halts the sheet P supplied from the sheet feeding device 7. Then, the timing roller pair 15 conveys the sheet P to the secondary transfer nip region so that the sheet P meets the full color toner image formed on the intermediate transfer belt 11 at the secondary transfer nip region. Thus, the full color toner image is transferred onto and borne on the sheet P. After the toner image is transferred from each of the photoconductors 2 onto the intermediate transfer belt 11, each of the cleaning devices 5 removes residual toner remaining on each of the photoconductors 2.

The sheet P transferred with the full color toner image on the surface is conveyed to the fixing device 9 that fixes the full color toner image onto the sheet P. Then, the sheet ejection device 10 ejects the sheet P onto the outside of the image forming apparatus 100, thus finishing a series of printing operations.

Figure 2:
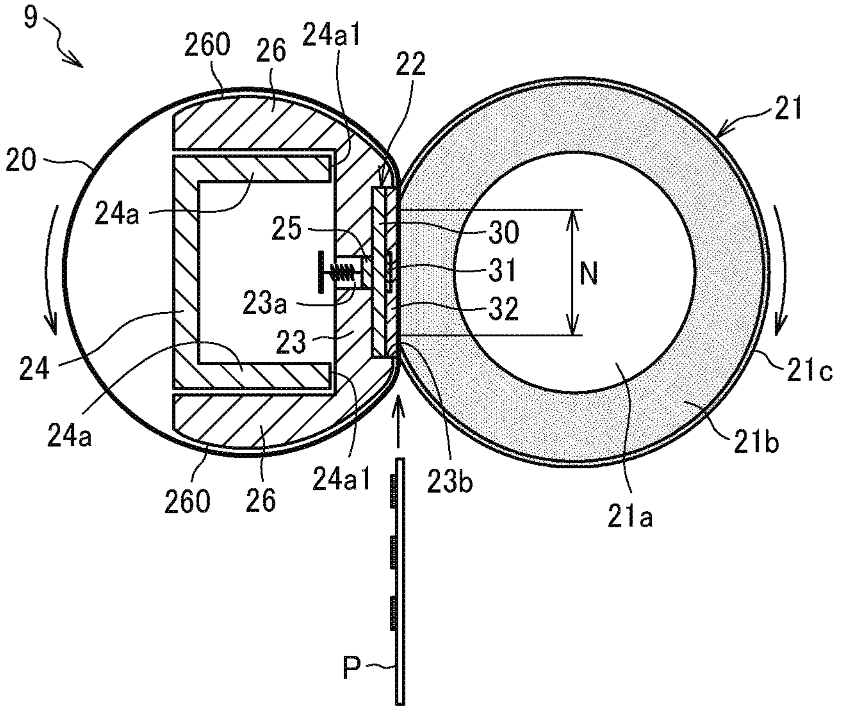
FIG. 2 is a cross-sectional side view of a fixing device according to an embodiment of the present disclosure.

A description is given of the configuration of the fixing device 9, with reference to FIG. 2.

FIG. 2 is a cross-sectional side view of the fixing device 9 according to an embodiment of the present disclosure.

As illustrated in FIG. 2, the fixing device 9 according to the present embodiment includes a fixing belt 20 as a rotator or a fixing member, a pressure roller 21 as a counter rotator or a pressure member, a heater 22, a heater holder 23 as a holder, a stay 24 as a support, and a thermistor 25 as a temperature sensor. The fixing belt 20 is an endless belt. The pressure roller 21 contacts the outer circumferential face of the fixing belt 20 to form a fixing nip region N between the pressure roller 21 and the fixing belt 20. The heater 22 heats the fixing belt 20. The heater holder 23 holds the heater 22. The stay 24 supports the heater holder 23. The thermistor 25 contacts the back face of a base 30 to detect the temperature of the base 30. A fixing rotator disposed in the fixing device is an aspect of the rotator disposed in the heating device of the present disclosure. The fixing device 9 in the present embodiment includes the fixing belt 20 serving as a fixing rotator.

The fixing belt 20, the pressure roller 21, the heater 22, the heater holder 23, and the stay 24 extend in a direction orthogonal to the sheet face of FIG. 2, in other words, a longitudinal direction. The longitudinal direction is an orthogonal direction that is a direction orthogonal to a conveyance direction in which a sheet is conveyed and parallel to the surface of the sheet. The orthogonal direction is also referred to as a conveyance orthogonal direction. The longitudinal direction is also the width direction of the sheet P to be conveyed, the belt width direction of the fixing belt 20, and the axial direction of the pressure roller 21.

The fixing belt 20 includes a base layer having, for example, a tubular base made of polyimide (PI), and the tubular base has an outer diameter of 25 mm and a thickness of from 40 μm to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 to 50 μm to enhance the durability of the fixing belt 20 and facilitate separation of the sheet P and a foreign substance from the fixing belt 20. An elastic layer made of rubber (rubber layer) having a thickness of from 50 to 500 μm may be interposed between the base layer and the release layer. The fixing belt 20 according to the present embodiment may be a rubberless belt including no elastic layer. The base layer of the fixing belt 20 may be made of heat resistant resin such as polyetheretherketone (PEEK) or metal such as nickel (Ni) and steel use stainless (SUS), instead of PI. The inner circumferential face of the fixing belt 20 may be coated with PI or PTFE as a slide layer.

The pressure roller 21 having, for example, an outer diameter of 25 mm, includes a solid iron core 21*a*, an elastic layer 21*b* formed on the surface of the solid iron core 21*a*, and a release layer 21*c* formed on the outside of the elastic layer 21*b*. The elastic layer 21*b* is made of silicone rubber (rubber layer) and has a thickness of 3.5 mm, for example. Preferably, the release layer 21*c* is formed by a fluororesin layer having, for example, a thickness of approximately 40 μm on the surface of the elastic layer 21*b* to enhance the releasability.

The pressure roller 21 is biased toward the fixing belt 20 by a biasing member and pressed against the heater 22 via the fixing belt 20. As a result, the fixing nip region N is formed between the fixing belt 20 and the pressure roller 21. As a driver drives and rotates the pressure roller 21 in a direction indicated by an arrow in FIG. 2, the fixing belt 20 is rotated along with the rotation of the pressure roller 21.

The heater 22 is disposed to contact the inner circumferential face of the fixing belt 20. The heater 22 according to the present embodiment contacts the pressure roller 21 via the fixing belt 20 and serves as a nip formation pad to form the fixing nip region N between the pressure roller 21 and the fixing belt 20. The fixing belt 20 is a heated member heated by the heater 22. In other words, the heater 22 heats the sheet P that passes through the fixing nip region N via the fixing belt 20.

The heater 22 is a planar heater extending in the longitudinal direction of the heater 22 that is parallel to the width direction of the fixing belt 20. The heater 22 includes a base 30 having a planar shape, resistive heat generators 31 disposed on the base 30, and an insulation layer 32 covering the resistive heat generators 31. The insulation layer 32 of the heater 22 contacts the inner circumferential face of the fixing belt 20, and the heat generated by the resistive heat generators 31 is transmitted to the fixing belt 20 through the insulation layer 32. Although the resistive heat generators 31 and the insulation layer 32 are disposed on the side of the base 30 facing the fixing belt 20 (that is, the fixing nip region N) according to the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed on the inner circumferential face (inside the loop) of the fixing belt 20. The stay 24 is made of a channeled metallic member, and both side plates of the fixing device 9 support both ends in the conveyance orthogonal direction of the stay 24. Since the stay 24 supports the heater holder 23 and the heater 22, the heater 22 reliably receives a pressing force of the pressure roller 21 pressed against the fixing belt 20. As a result, the fixing nip region N is stably formed between the fixing belt 20 and the pressure roller 21. In the present embodiment, the thermal conductivity of the heater holder 23 is set smaller than the thermal conductivity of the base 30.

Since the heater holder 23 is heated to a high temperature by heat from the heater 22, the heater holder 23 is preferably made of a heat resistant material. The heater holder 23 made of heat-resistant resin having low thermal conduction, such as a liquid crystal polymer (LCP) or PEEK, reduces heat transfer from the heater 22 to the heater holder 23. As a result, the heater 22 can efficiently heat the fixing belt 20.

The heater holder 23 has a recess 23*b* to hold the heater 22.

As illustrated in FIG. 2, the heater holder 23 includes guide ribs 26 to guide the fixing belt 20. The heater holder 23 and the guide ribs 26 may be formed as a single unit. The guide ribs 26 are disposed both upstream and downstream from the heater holder 23 in the sheet conveyance direction, in the conveyance orthogonal direction.

Each of the guide ribs 26 has a substantially fan shape. Each of the guide ribs 26 has a guide face 260 that is an arc-shaped or convex curved face extending in a belt circumferential direction along the inner circumferential face of the fixing belt 20.

The heater holder 23 has openings 23*a* extending through the heater holder 23 in the thickness direction. The thermistor 25 and a thermostat that is described below are disposed in the openings 23*a*. The thermistor 25 and the thermostat are pressed against the back face of the base 30 by a spring, so as to detect the temperature of the heater 22. As described below, the fixing device 9 is provided with end thermistors 25A and center thermistor 25B. The end thermistors 25A and the center thermistor 25B are collectively referred to as the thermistors 25.

When the fixing device 9 according to the present embodiment starts printing, the pressure roller 21 is driven to rotate and the fixing belt 20 starts to be rotated along the rotation of the pressure roller 21. The guide face 260 of each of the guide ribs 26 contacts and guides the inner circumferential face of the fixing belt 20 to stably and smoothly rotates the fixing belt 20. As power is supplied to the resistive heat generators 31 of the heater 22, the heater 22 heats the fixing belt 20. When the temperature of the fixing belt 20 reaches a fixing temperature that is a predetermined desired temperature, as illustrated in FIG. 2, the sheet P bearing an unfixed toner image is conveyed to the fixing nip region N between the fixing belt 20 and the pressure roller 21, and the unfixed toner image is heated and pressed to be fixed to the sheet P.

Figure 3:
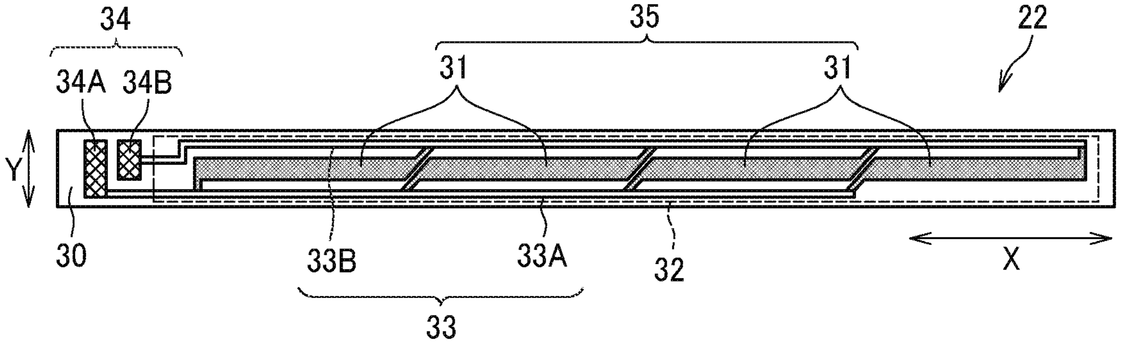
FIG. 3 is a plan view of a heater included in the fixing device of FIG. 2.

A detailed description is now given of the heater disposed in the above-described fixing device, with reference to FIG. 3.

FIG. 3 is a plan view of a heater according to the present embodiment.

As illustrated in FIG. 3, the heater 22 includes the base 30 having the planar shape. A plurality of resistive heat generators 31 (four resistive heat generators 31 in the present embodiment), power supply lines 33A and 33B that are conductors, a first electrode 34A, and a second electrode 34B are disposed on the surface of the base 30. However, the number of resistive heat generators 31 is not limited to four in the present embodiment. The power supply lines 33A and 33B are also referred to as power supply lines 33, and the first electrode 34A and the second electrode 34B are also referred to as electrodes 34.

A left-right direction X in FIG. 3 is the conveyance orthogonal direction described above and is also an arrangement direction of the plurality of resistive heat generators 31. In addition, a vertical direction Y in FIG. 3 is the sheet conveyance direction and a direction that intersects the arrangement direction. In particular, in the present embodiment, the vertical direction Yin FIG. 3 is also the direction that intersects the arrangement direction of the plurality of resistive heat generators 31 and is different from a thickness direction of the base 30. The vertical direction Y that is the sheet conveyance direction is also a lateral direction of the heater 22.

The plurality of resistive heat generators 31 include a plurality of heat generation portions 35 divided in the conveyance orthogonal direction. The resistive heat generators 31 are electrically coupled in parallel to a pair of electrodes 34A and 34B via the power supply lines 33A and 33B. The pair of electrodes 34A and 34B is disposed on an end in the conveyance orthogonal direction of the base 30, that is, the left end of the base 30 in FIG. 3. The power supply lines 33A and 33B are made of conductors having an electrical resistance value smaller than an electrical resistance value of the resistive heat generator 31. A gap area between adjacent resistive heat generators 31 disposed adjacent to each other is preferably 0.2 mm or more, more preferably 0.4 mm or more from the viewpoint of maintaining the insulation between the adjacent resistive heat generators 31. If the gap area between the adjacent resistive heat generators 31 is too large, the gap area is likely to cause a decrease in temperature in the gap area. Accordingly, from the viewpoint of reducing the temperature unevenness in the conveyance orthogonal direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases to decrease the heater output as the temperature increases.

The resistive heat generators 31 have the PTC characteristic and include the heat generation portions 35 divided in the conveyance orthogonal direction. This configuration prevents overheating of the fixing belt 20 when small-size sheets pass through the fixing device 9. When the small-sized sheets each having a width smaller than the entire width of the heat generation portion 35 pass through the fixing device 9, the temperature of a region of the resistive heat generator 31 corresponding to a region of the fixing belt 20 outside the small-size sheet increases because the small-size sheet does not absorb heat of the fixing belt in the region outside the small-size sheet that is the region outside the width of the small-size sheet. Since a constant voltage is applied to the resistive heat generators 31, the temperature increase in the regions outside the width of the small-sized sheets causes the increase in resistance values of the resistive heat generators 31. The increase in temperature relatively reduces outputs (that is, heat generation amounts) of the heater in the regions, thus preventing an increase in temperature at an end of the fixing belt outside the small sheets. Electrically coupling the plurality of resistive heat generators 31 in parallel can prevent a rise of temperature in non-sheet passing regions while maintaining the printing speed. Heat generators included in the heat generation portion 35 may not be the resistive heat generators each having the PTC characteristic. The resistive heat generators in the heater 22 may be arranged in a plurality of rows arranged on the heater 22 in the sheet conveyance direction.

The resistive heat generator 31 is produced by, for example, mixing silver-palladium (AgPd) or glass powder, into a paste. The paste is coated on the base 30 by, for example, screen printing. Then, the base 30 is fired to form the resistive heat generator 31. The resistive heat generators 31 each have a resistance value of 80Ω at room temperature, in the present embodiment. The material of the resistive heat generators 31 may contain a resistance material, such as silver alloy (AgPt) or ruthenium oxide (RuO2), other than the above material. Silver (Ag) or silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The base 30 according to the present embodiment includes an alumina base having a width of 8 mm in the sheet conveyance direction, a length of 270 mm in the conveyance orthogonal direction, and a thickness of 1.0 mm. Alternatively, the base 30 may be made by layering the insulation material on conductive material such as metal. Low-cost aluminum or stainless steel is preferable as the metal material of the base 30. The base 30 made of a stainless-steel plate is resistant to cracking due to thermal stress. To enhance the thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 4:
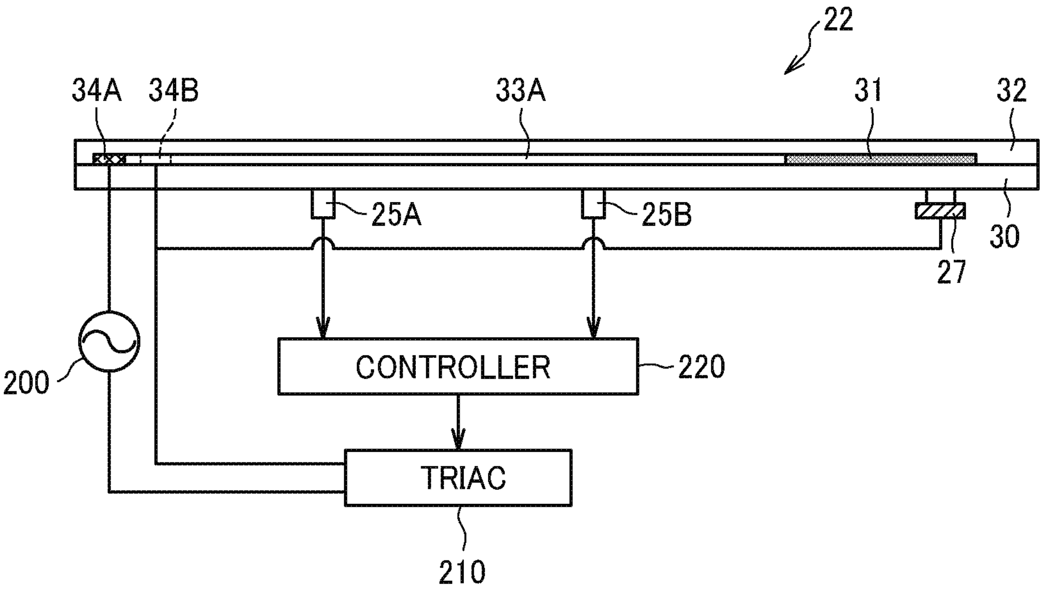
FIG. 4 is a diagram illustrating a circuit to supply power to the heater of FIG. 3.

FIG. 4 is a schematic diagram illustrating a circuit to supply power to the heater according to the present embodiment.

As illustrated in FIG. 4, the alternating current power supply 200 is electrically coupled to the electrodes 34A and 34B of the heater 22 to configure a power supply circuit according to the present embodiment to supply power to the resistive heat generators 31. The power supply circuit includes a triac 210 that controls an amount of power supplied. A controller 220 controls the amount of power supplied to the resistive heat generators 31 via the triac 210 based on the temperatures detected by the thermistors 25 including the end thermistor 25A and the center thermistor 25B. The controller 220 includes a microcomputer including, for example, a central processing unit (CPU), a read only memory (ROM), a random access memory (RAM), and an input and output (I/O) interface. The controller 220 may be disposed in the fixing device or in the housing of the image forming apparatus.

In the present embodiment, the end thermistor 25A serving as a first temperature sensor is disposed at one end of the heater 22 in the conveyance orthogonal direction and the center thermistor 25B serving as a second temperature sensor is disposed in the center area of the heater 22 in the conveyance orthogonal direction, within the minimum conveyance span for the smallest sheet.

A thermostat 27 serving as a power cut-off device is disposed at the other end of the heater 22 in the conveyance orthogonal direction. The thermostat 27 cuts off power supply to the resistive heat generators 31 when the temperature of the resistive heat generator 31 becomes a predetermined temperature or higher. The thermistor 25 and the thermostat 27 contact the back face of the base 30 to detect the temperature of the base 30. The end thermistor 25A and the center thermistor 25B are also referred to as the thermistors 25.

In the present embodiment, the first electrode 34A and the second electrode 34B are disposed on the same end of the base 30 in the conveyance orthogonal direction. However, the first electrode 34A and the second electrode 34B may be disposed on different ends of the base 30 in the conveyance orthogonal direction. The shape of the resistive heat generator 31 is not limited to the shape of the resistive heat generator 31 in the present embodiment.

Figure 5:
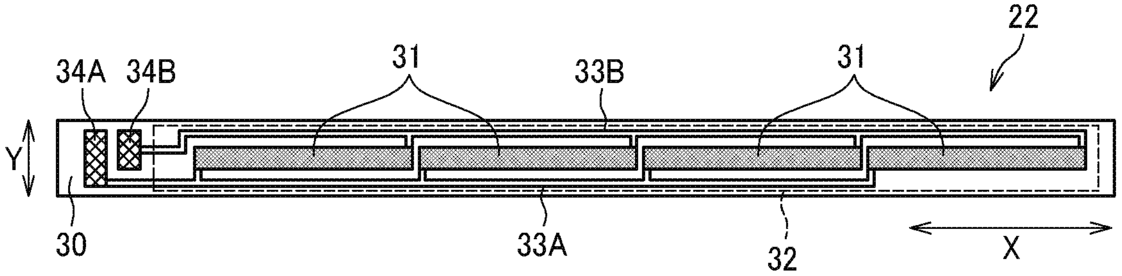
FIG. 5 is a plan view of another heater different from the heater of FIG. 3 in the shape of resistive heat generators each having a form different from the form of each of resistive heat generators illustrated in FIG. 3.

For example, FIG. 5 is a plan view of another heater 22 different from the heater 22 illustrated in FIG. 3, in the shape of the resistive heat generators 31 each having a form different from the form of each of the resistive heat generators 31 illustrated in FIG. 3.

As illustrated in FIG. 5, the shape of the resistive heat generator 31 may be a rectangular shape.

Figure 6:
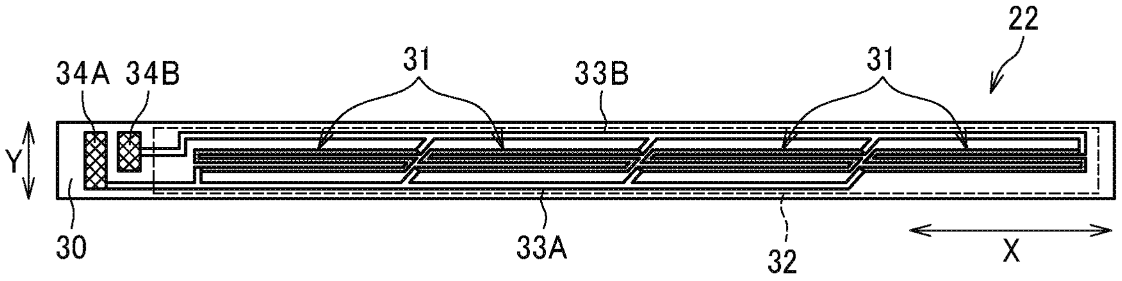
FIG. 6 is a plan view of yet another heater different from the heaters of FIGS. 3 and 5 in the shape of resistive heat generators each having a form different from the form of each of the resistive heat generators illustrated in FIGS. 3 and 5.

Alternatively, FIG. 6 is a plan view of yet another heater 22 different from the heaters 22 of FIGS. 3 and 5, in the shape of the resistive heat generators 31 each having a form different from the form of each of the resistive heat generators 31 illustrated in FIGS. 3 and 5.

As illustrated in FIG. 6, the resistive heat generator 31 may have a linear portion folding back to form a substantially parallelogram shape. In addition, as illustrated in FIG. 5, portions each extending from the resistive heat generator 31 having a rectangular shape to one of the power supply lines 33A and 33B (the portion extending in the sheet conveyance direction) may be a part of the resistive heat generator 31 or may be made of the same material as the power supply lines 33A and 33B.

In the heating device provided with the rotator, if the recording medium is conveyed when the temperature of the rotator is not sufficiently increased, the heating failure of the recording medium occurs. In other words, since the end of the fixing belt in the conveyance orthogonal direction is not sufficiently heated in the above-described fixing device, the fixing failure of the image on the sheet to the sheet occurs.

Such a fixing failure occurs due to an insufficient rise in temperature at an end or ends of a sheet. For example, when the image forming apparatus is started up from a cooled state, the end of the fixing belt 20 in the conveyance orthogonal direction is more delayed in temperature rise than the center portion of the fixing belt 20. For this reason, the sheet passing through the fixing nip region N is not sufficiently heated on the end or ends with respect to the center portion, resulting in an inconvenience causing a fixing failure on the end of the sheet. This inconvenience is referred to as Inconvenience 1.

Figure 7:
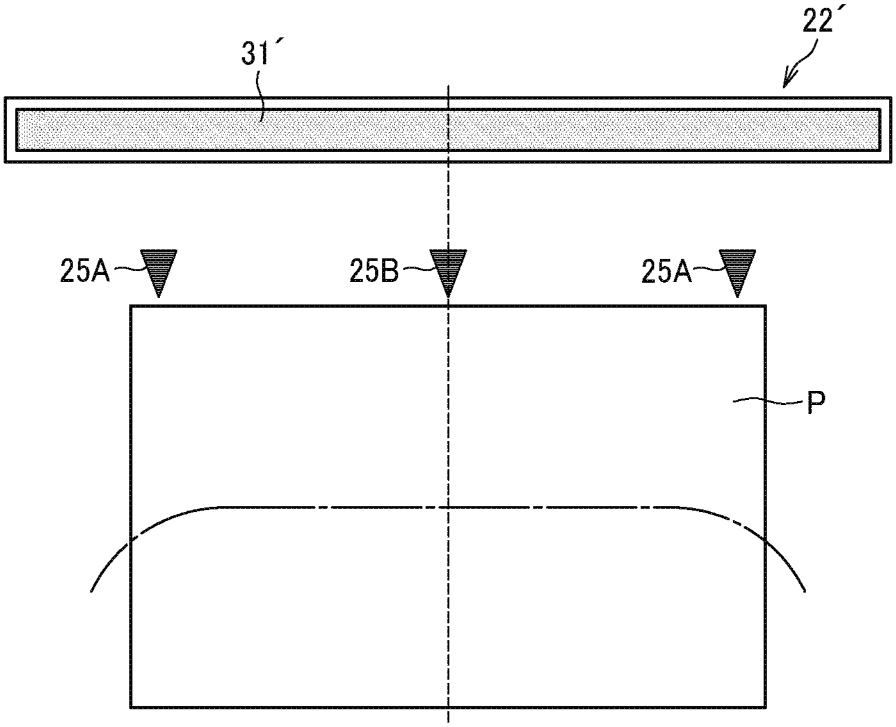
FIG. 7 is a diagram illustrating the positions of thermistors in another image forming apparatus different from the positions of thermistors in the image forming apparatus of FIG. 1.

FIG. 7 is a diagram illustrating the positions of thermistors in another image forming apparatus different from the positions of thermistors in the fixing device of the image forming apparatus 100 of FIG. 1.

The broken line in FIG. 7 indicates the center position of the sheet P in the conveyance orthogonal direction. A dot-dashed line in FIG. 7 indicates the temperature distribution of the base of the heater in the conveyance orthogonal direction. Note that the fixing belt tends to have the similar temperature distribution to the temperature distribution of the base of the heater illustrated in FIG. 7. In FIG. 7, the heater is simplified as a heater 21' for the sake of convenience, and only a range in which the resistive heat generator 31' is provided on the heater is simply illustrated.

The fixing device illustrated in FIG. 7 has the center thermistor 25B at the center of the sheet in the conveyance orthogonal direction, and the end thermistors 25A on one side and the other side of the sheet in the conveyance orthogonal direction. The end thermistors 25A detect the temperature of both ends of the fixing belt 20 in the conveyance orthogonal direction and can heat both ends of the fixing belt 20 in the conveyance orthogonal direction to a sufficient temperature. As a result, the above-described fixing failure can be prevented. In other words, Inconvenience 1 can be removed.

However, in the configuration of FIG. 7, a fixing failure occurs when the sheet is displaced with respect to the conveyance orthogonal direction. In other words, due to displacement of a sheet when the sheet is set to the sheet tray or when the sheet is being conveyed, the sheet conveyed to the fixing device is displaced in the conveyance orthogonal direction.

Figure 8:
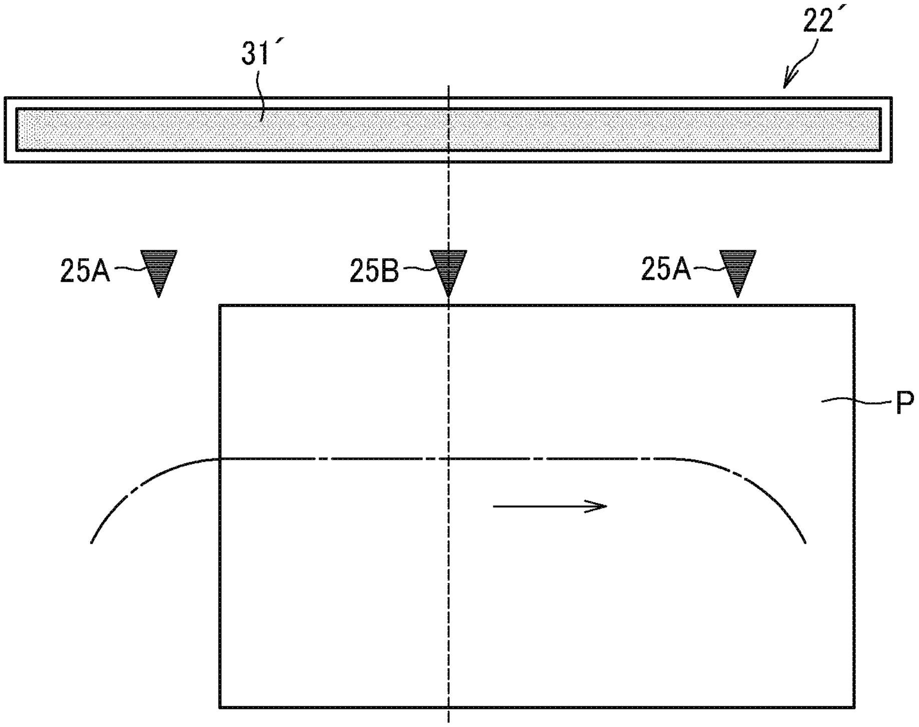
FIG. 8 is a diagram illustrating the positions of the thermistors with displacement in the image forming apparatus illustrated in FIG. 7.

For example, FIG. 8 is a diagram illustrating the positions of the end thermistors 25A with displacement in the fixing device of the image forming apparatus illustrated in FIG. 7. As illustrated in FIG. 8, when the sheet P is displaced to the right in FIG. 8, the right end of the sheet P passes through a low-temperature region of the fixing belt 20 outside the end thermistors 25A, and the sheet P is not sufficiently heated in this region. As a result, the fixing failure of the image to the sheet P occurs. This inconvenience is referred to as Inconvenience 2.

Further, when such a fixing failure occurs, toner and sheet are wasted. For this reason, the abnormal condition is to be detected earlier in the image forming apparatus. This inconvenience is referred to as Inconvenience 3.

Figure 9:
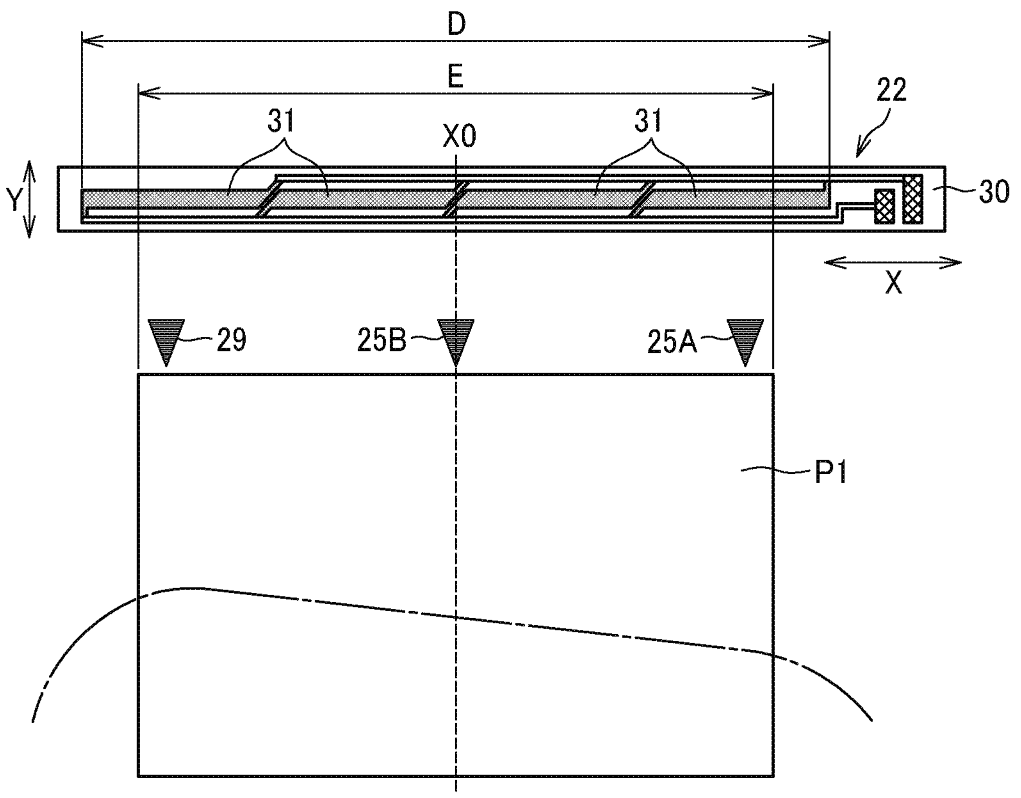
FIG. 9 is a diagram illustrating the positions of the thermistors and a medium detection sensor included in the image forming apparatus according to an embodiment of the present disclosure.

A description is given of the configuration according to the present embodiment to remove the above-described inconveniences, with reference to FIG. 9.

FIG. 9 is a diagram illustrating the positions of the thermistors 25 and the medium detection sensor 29 included in the image forming apparatus 100 according to an embodiment of the present disclosure.

As illustrated in FIG. 9, the end thermistor 25A serving as a first temperature sensor, the center thermistor 25B serving as a second temperature sensor, and the medium detection sensor 29 serving as a recording medium sensor are disposed at the positions facing the heat area D serving as a main heat generation area of the heater 22.

The heat area D is an area in which the resistive heat generators 31 are disposed in the conveyance orthogonal direction corresponding to the left-to-right direction X. The heat area D also serves as a heat area of the heater 22 in the conveyance orthogonal direction. The heat area D includes the gap area between the adjacent resistive heat generators 31, for example, as the heater 22 illustrated in FIG. 5.

In the present embodiment, the end thermistor 25A and the center thermistor 25B are disposed in the fixing device 9, and the medium detection sensor 29 is disposed in the sheet tray 16 (see FIG. 1) of the sheet feeding device 7. In other words, the positions of the end thermistor 25A, the center thermistor 25B, and the medium detection sensor 29 in the conveyance orthogonal direction illustrated in FIG. 9 indicate the positions of the respective devices in the conveyance orthogonal direction corresponding to the left-to-right direction X.

The image forming apparatus including the fixing device provided with the end thermistor 25A and the center thermistor 25B, and the sheet feeding device provided with the medium detection sensor 29 is the sheet conveyor according to the present embodiment. However, the configuration of the sheet conveyor according to the present disclosure is not limited to this configuration. For example, a heating device including a heating body or a heater may be applied to the present disclosure as a sheet conveyor. In other words, the heating device may be a sheet conveyor including the first temperature sensor, the second temperature sensor, and the recording medium sensor. The fixing device 9 according to the present embodiment may serve as a heating device. In addition, the recording medium sensor can be provided at an appropriate position in a range from when the recording medium is loaded in the image forming apparatus to when the recording medium is ejected to the outside of the image forming apparatus. In addition, the fixing device in the image forming apparatus and another device having the recording medium sensor may be combined to form the sheet conveyor according to the present disclosure.

Figure 10:
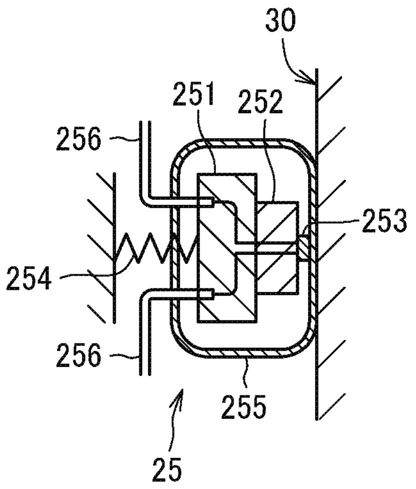
FIG. 10 is a cross-sectional view of a thermistor according to an embodiment of the present disclosure.

A description is given of a further detailed configuration of the thermistor 25, with reference to FIG. 10.

FIG. 10 is a cross-sectional view of the thermistor 25 according to an embodiment of the present disclosure.

The end thermistor 25A and the center thermistor 25B according to the present embodiment basically have the same configuration except that the end thermistor 25A and the center thermistor 25B are disposed at different positions in the conveyance orthogonal direction. However, the end thermistor 25A and the center thermistor 25B may not have the same configuration.

As illustrated in FIG. 10, the thermistor 25 includes a holder 251, an elastic member 252, a temperature detection element 253 as a temperature sensor, a spring 254 as a biasing member, and an insulation sheet 255.

The holder 251 is made of a heat-resistant resin such as LCP. The temperature detection element 253 is disposed on the surface of the holder 251 proximate to the base of the heater, via the elastic member 252. The elastic member 252 is made of a material having lower thermal conductivity and lower rigidity than the thermal conductivity and rigidity of the holder 251. With this configuration, the elastic member 252 has elasticity and thermal insulation. The insulation sheet 255 is made of an insulating material such as polyimide (PI), and is disposed so as to cover the holder 251, the elastic member 252, and the temperature detection element 253. The holder 251 is biased toward the heater 22 by the spring 254. By so doing, the temperature detection element 253 contacts the heater 22 via the insulation sheet 255. Two wires 256 connected to the temperature detection element 253 extend from the holder 251. Each of the wires 256 is covered with an insulation film. In consideration of heat resistance, each of the wires 256 is desirably has the coating thickness of, for example, 0.4 mm or more. When the film thickness is less than 0.4 mm, a plurality of films may be stacked.

The thermistor 25 may be a non-contact type temperature sensor.

Figure 11:
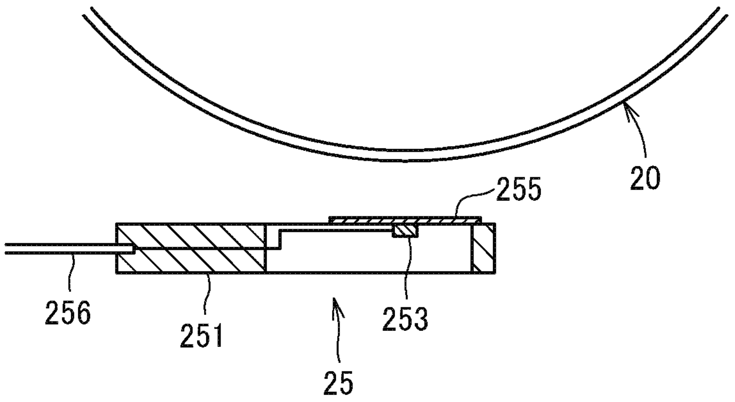
FIG. 11 is a cross-sectional view of another thermistor according to an embodiment of the present disclosure, different from the thermistor illustrated in FIG. 10.

FIG. 11 is a cross-sectional view of another thermistor according to an embodiment of the present disclosure, different from the thermistor 25 illustrated in FIG. 10.

For example, as illustrated in FIG. 11, the thermistor 25 as a non-contact type temperature sensor includes a holder 251, a temperature detection element 253, and an insulation sheet 255. In FIG. 11, the thermistor 25 is disposed upstream from the fixing nip region N in the sheet conveyance direction. In other words, the thermistor 25 is disposed in the lower part of FIG. 2. However, the thermistor 25 may be disposed downstream of the fixing nip region N in the sheet conveyance direction.

The temperature detection element 253 is disposed on the holder 251 and faces the outer circumferential face of the fixing belt 20 via the insulation sheet 255. Two wires 256 held by the holder 251 are connected to the temperature detection element 253 at one end and extend to the outside of the thermistor 25 at the other end. Since the thermistor 25 requires less heat resistance than a contact-type thermistor, the holder 251 can be formed of a material having lower heat resistance or the elastic member can be omitted. In addition, a biasing member for biasing the temperature detection element 253 is not required.

Further, the first temperature sensor and the second temperature sensor may be sensors that detect the temperatures of different members contacting the heater 22. For example, the first high-thermal conduction members 28 described below (see FIG. 18) may be disposed between the heater 22 and the thermistor 25, so that the thermistor 25 detects the temperature of the first high-thermal conduction members 28. When the thermistor 25 detects the temperature of the heater 22, the thermistor 25 may detect the temperature of the heater 22 via another member.

Figure 12A:
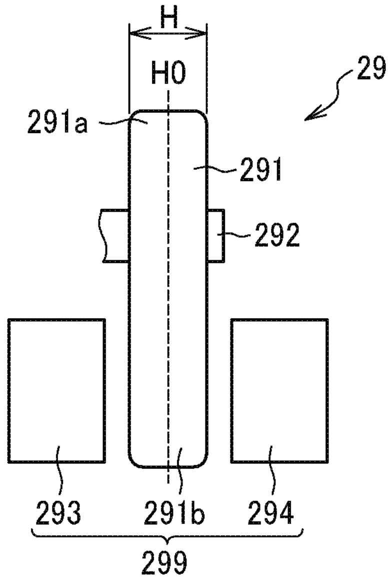
FIG. 12A is a front view of the overall configuration of the medium detection sensor according to an embodiment of the present disclosure.
Figure 12B:
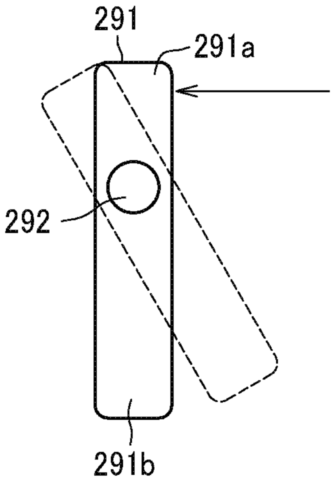
FIG. 12B is a side view of the medium detection sensor of FIG. 12A, indicating the rotational motion of a shield of the medium detection sensor.

A description is given of the medium detection sensor 29, with reference to FIGS. 12A and 12B.

FIG. 12A is a front view of the overall configuration of the medium detection sensor 29 according to an embodiment of the present disclosure.

FIG. 12B is a side view of the medium detection sensor 29 of FIG. 12A, indicating the rotational motion of a shield of the medium detection sensor 29.

As illustrated in FIG. 12A, the medium detection sensor 29 includes a light shielding member 291, a shaft 292, a light emitting unit 293, and a light receiving unit 294.

As illustrated in FIG. 12B, the light shielding member 291 rotates around the shaft 292. A contacted portion 291*a* is provided at one end of the light shielding member 291. The contacted portion 291*a* is disposed on the medium passage in the image forming apparatus, in particular, on the medium passage in the sheet tray 16 in the present embodiment. When the sheet is conveyed in the direction indicated by arrow in FIG. 12B, the sheet contacts the contacted portion 291*a*, rotating the light shielding member 291.

The solid line in FIG. 12B indicates the position of the light shielding member 291 when the sheet does not contact the light shielding member 291. The broken line in FIG. 12B indicates the position of the light shielding member 291 when the sheet contacts the light shielding member 291 to rotate the light shielding member 291. By switching these positions of the light shielding member 291 in FIG. 12B, the other end 291*b* of the light shielding member 291 illustrated in FIG. 12A s switched between the position that the other end 291*b* of the light shielding member 291 blocks light from the light emitting unit 293 and the position that the other end 291*b* of the light shielding member 291 does not block light from the light emitting unit 293. In other words, the detection state can be changed in accordance with whether the sheet passes or not. The light emitting unit 293, the other end 291*b*, and the light receiving unit 294 are included in a photo coupler unit 299. A range within which the contacted portion 291*a* is disposed in the conveyance orthogonal direction is a medium detection region H of the medium detection sensor 29. A broken line H0 in FIG. 12A indicates the center position of the medium detection region H in the conveyance orthogonal direction.

Although the medium detection sensor 29 is a transmission-type optical sensor in FIGS. 12A and 12B, the medium detection sensor 29 may be a reflection-type optical sensor. In addition, an appropriate mechanism may be used as the recording medium sensor, such as a push-button type detection sensor that presses a button by a sheet conveyed on the sheet conveyance passage or a magnetic sensor that changes a detection state by a rotational operation of a rotator pressed by a sheet conveyed on the sheet conveyance passage.

As illustrated in FIG. 9, in the present embodiment, the end thermistor 25A is disposed on the end of the maximum medium passage region E, and the center thermistor 25B is disposed at the center of the maximum medium passage region E. In other words, the end thermistor 25A is disposed at least in the region on the end of the maximum medium passage region E when the maximum medium passage region E is equally divided into three, and the center thermistor 25B is disposed at least in the region at the center of the maximum medium passage region E when the maximum medium passage region E is equally divided into three. Particularly in the present embodiment, the temperature detection element 253 of the end thermistor 25A is disposed proximate to the end of the maximum medium passage region E, and the temperature detection element 253 of the center thermistor 25B is disposed at the same position as a reference position X0.

The maximum medium passage region E is a medium passage region when the sheet having the maximum width allowed in the fixing device 9 has passed without displacement of the sheet. The medium passage region in which a sheet P1 having the maximum width allowed in the fixing device 9 is referred to as the maximum medium passage region E as the maximum passage region of a recording medium.

The reference position X0 according to the present embodiment is the center position of a sheet in the conveyance orthogonal direction when the sheet is conveyed without any displacement on the sheet conveyance passage in the sheet feeding device or the image forming apparatus. Further, in the present embodiment, the reference position X0 is the center position of the heat area D. When the center position of the heat area D coincides with the reference position X0, the center position of the heat area D may exactly coincide with the heat area D or may have a certain error in the distance with respect to the reference position X0. The same condition applies to the case where the reference position X0 coincides with the center position of the elastic layer of the pressure roller in the embodiments described below.

The heat area D is provided larger than the medium passage region (i.e., the maximum medium passage region E). Due to such a configuration, the above-described insufficient rise in temperature on the end of the (maximum) medium passage region E can be reduced or prevented. The end thermistor 25A, the center thermistor 25B, and the medium detection sensor 29 are disposed within the maximum medium passage region E.

In FIG. 9, the length of the region on the right side of the base 30 with respect to the reference position X0 is longer than the length of the region on the left side of the base 30. In other words, since the electrode portion of the base 30 is disposed to be biased to one side, the length on the right side of the base 30 is longer than the length of the region on the left side of the base 30 in FIG. 9. Due to such a configuration, the thermal mass of the base 30 is greater in the region on the right side of the base 30 than in the region on the left side of the base 30, with respect to the reference position X0 in FIG. 9. As a result, the temperature on the right side of the heater 22 is lower than the temperature on the left side of the heater 22, with respect to the reference position X0 in FIG. 9. A region on the right side of the reference position X0 in FIG. 9 is a small heat-distribution amount region of the present embodiment, and a region on the left side of the reference position X0 in FIG. 9 is a large heat-distribution amount region of the present embodiment.

The "large heat-distribution amount region" is a region on a high temperature side of the heater 22 with respect to the reference position X0, and the "small heat-distribution amount region" is a region on a low temperature side of the heater 22 on the opposite side of the "large heat-distribution amount region". The temperature of the heater 22 is a temperature when the heater 22 alone is caused to generate heat and the temperature in the conveyance orthogonal direction is measured.

The medium detection sensor 29 is disposed on the opposite side of the end thermistor 25A with respect to the reference position X0 and within the area proximate to the end of the maximum medium passage region E.

In the present embodiment, the end thermistor 25A detects the temperature of the heater 22 on the end of the maximum medium passage region E, and the energization to the heater 22 is controlled based on the detection result. By so doing, the area on the end of the fixing belt 20 can be heated to the sufficient temperature, and the end of the sheet in the conveyance orthogonal direction can be sufficiently heated. As a result, this configuration can prevent the fixing failure due to the insufficient rise in temperature on the end of the sheet in the conveyance orthogonal direction. In other words, Inconvenience 1 can be removed.

Figure 13:
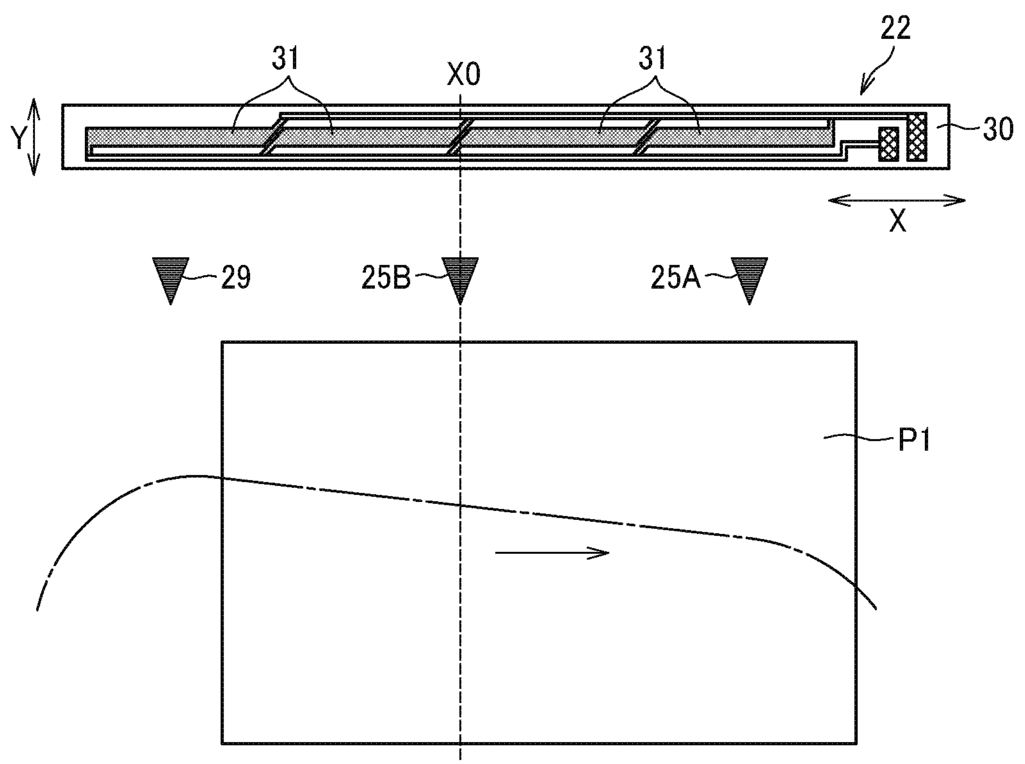
FIG. 13 is a diagram illustrating a state in which a recording medium is displaced to one side.

Further, FIG. 13 is a diagram illustrating a state in which a recording medium is displaced to one side.

As illustrated in FIG. 13, when the sheet P1 is conveyed while the position of the sheet P1 in the conveyance orthogonal direction is shifted to the right in FIG. 13, the medium detection sensor 29 is brought into the non-detection state, and the displacement of the sheet P1 can be detected. As a result, the fixing failure in the fixing device 9 can be prevented and Inconvenience 2 can be removed. Further, even in the case of continuous printing, displacement of the sheet can be detected at an early stage, for example, the displacement of the sheet can be detected from the first sheet. As a result, Inconvenience 3 can be removed.

Figure 14:
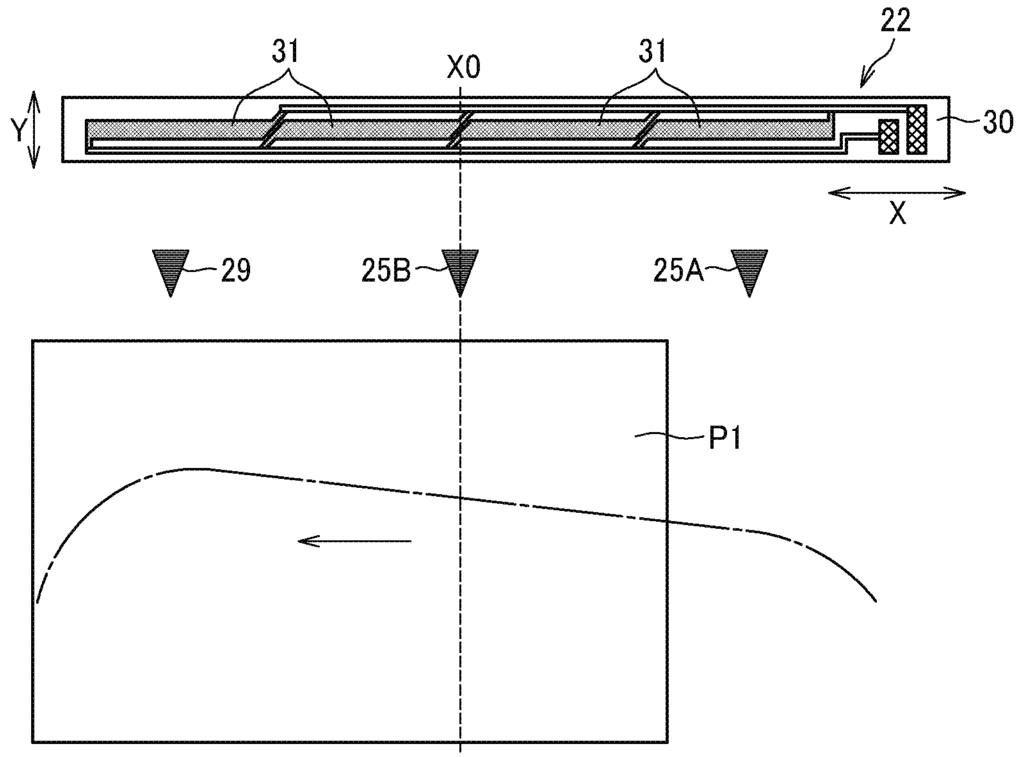
FIG. 14 is a diagram illustrating a state in which the recording medium is displaced to another side.

Further, FIG. 14 is a diagram illustrating a state in which the recording medium is displaced to another side.

As illustrated in FIG. 14, when the sheet P1 is displaced to the opposite direction in which the sheet P1 is displaced in FIG. 13, the sheet P1 is displaced to the side of the large heat-distribution amount region. In other words, since the sheet P1 is disposed on the side where the heat generation amount of the heater 22 is larger than the other side, the fixing failure of the image to the sheet P1 does not occur. As a result, Inconveniences 2 and 3 can be removed.

As described above, in the present embodiment, even when the sheet P1 is displaced in any direction as illustrated in FIGS. 13 and 14, Inconveniences 2 and 3 can be removed.

As described above, the setting of the end thermistor 25A and the medium detection sensor 29 according to the present embodiment can remove Inconveniences 1, 2, and 3, and the fixing failure in the fixing device can be effectively prevented.

A description is given below of the heater 22 according to a modification of the present embodiment.

Figure 15:
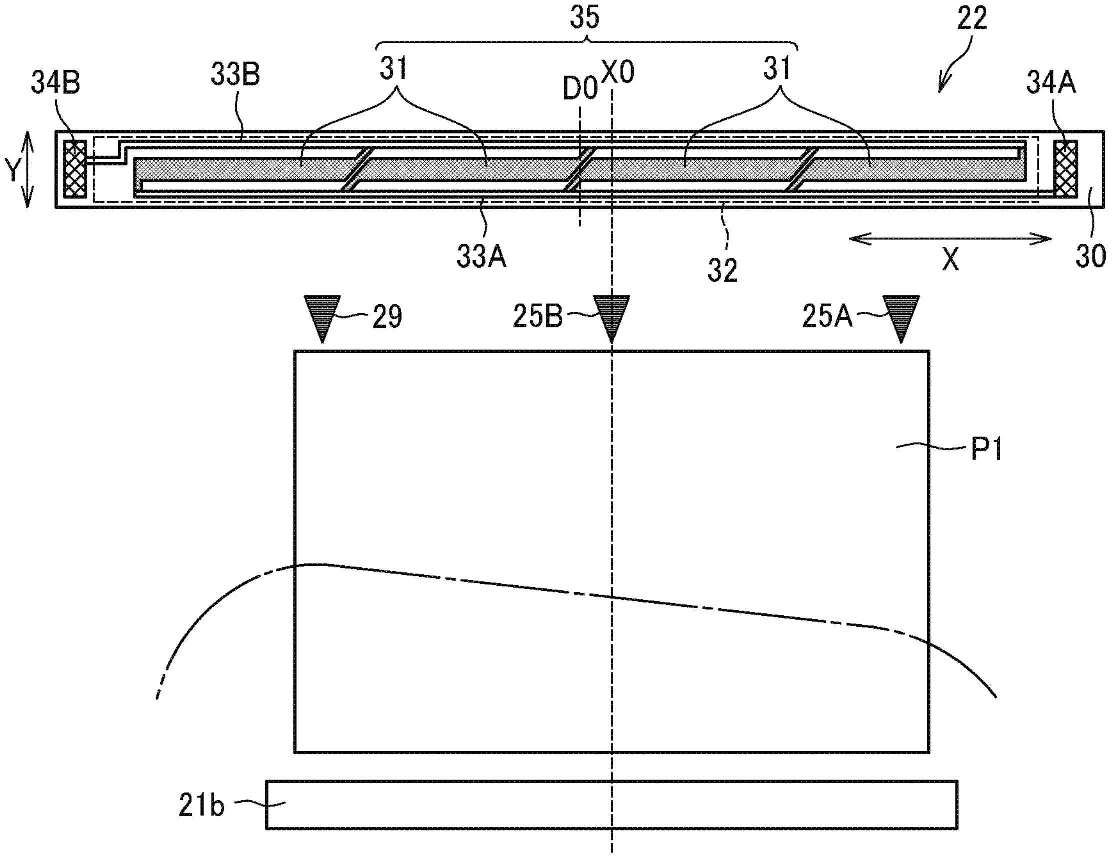
FIG. 15 is a plan view of a heater according to a modification of an embodiment of the present disclosure.

FIG. 15 is a plan view of the heater 22 according to a modification of the above embodiments of the present disclosure.

In the modification illustrated in FIG. 15, the reference position X0 that is the center position of the sheet to be fed in the conveyance orthogonal direction is also the center position of the elastic layer 21*b* of the pressure roller 21 in the conveyance orthogonal direction. Further, the center position D0 of the heat area D is different from the reference position X0. In other words, in the embodiment of FIG. 15, the length of the heat area D is longer on the side where the center position D0 of the heat area D is provided with respect to the reference position X0, than on the side where the center position D0 is not provided. For this reason, in the present embodiment, the left side of FIG. 15 is the large heat-distribution amount region, and the right side of FIG. 15 is the small heat-distribution amount region. In the present embodiment, the first electrode 34A is disposed on one end of the heater 22 and the second electrode 34B is disposed on the other end of the heater 22 in the conveyance orthogonal direction. The center position of the base 30 in the conveyance orthogonal direction coincides with the reference position X0.

Figure 16:
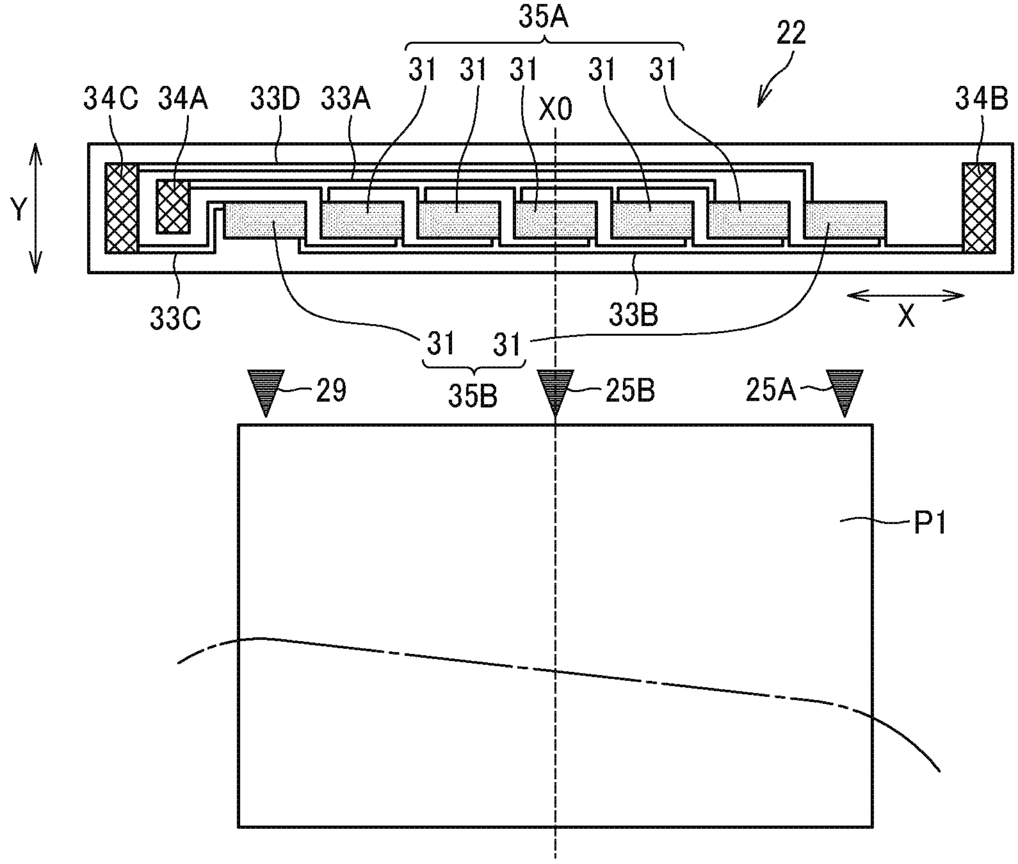
FIG. 16 is another plan view of a heater according to another modification of an embodiment of the present disclosure.

Further, FIG. 16 is a plan view of the heater 22 according to another modification of the present embodiment.

In this modification, the reference position X0 that is the center position of the sheet to be fed in the conveyance orthogonal direction coincides with the center position of the heat area D and the center position of the base 30.

The heater 22 of FIG. 16 has independent heat generating portions at the center and both ends of the heater 22 in the conveyance orthogonal direction. Specifically, the heater 22 includes a plurality of resistive heat generators 31 aligned in the conveyance orthogonal direction on the base 30. Among the plurality of resistive heat generators 31, the resistive heat generators 31 other than the resistive heat generators 31 at both ends are included in a first heat generation portions 35A and the resistive heat generators 31 at both ends are included in second heat generation portions 35B. The first heat generation portions 35A and the second heat generation portions 35B are separately controllable to independently generate heat. More specifically, the resistive heat generators 31 other than the resistive heat generators 31 at both ends of the heater 22 are included in the first heat generation portions 35A. Each of the resistive heat generators 31 of the first heat generation portions 35A is connected to the first electrode 34A provided on the base 30 in the conveyance orthogonal direction, through the first power supply line 33A. Each of the resistive heat generators 31 of the first heat generation portions 35A is also connected to the second electrode 34B provided on the other end of the base 30 in the conveyance orthogonal direction, in other words, on the end opposite from the first electrode 34A in the conveyance orthogonal direction, through the second power supply line 33B. On the other hand, each of the resistive heat generators 31 of the second heat generation portions 35B (i.e., the resistive heat generators 31 on both ends) is connected to the third electrode 34C (different from the first electrode 34A) provided on the end of the base 30 in the conveyance orthogonal direction, through a third power supply line 33C or a fourth power supply line 33D. Like each of the resistive heat generators 31 of the first heat generation portions 35A, the resistive heat generators 31 at both ends are connected to the second electrode 34B through the second power supply line 33B. In other words, the power supply lines (i.e., the second power supply lines 33B) extending from each of the resistive heat generators 31 are joined and connected to the second electrode 34B.

Applying the voltage to the first electrode 34A and the second electrode 34B energizes the resistive heat generators 31 other than the resistive heat generators 31 at both ends, so that only the first heat generation portions 35A generate heat. On the other hand, applying the voltage to the second electrode 34B and the third electrode 34C energizes the resistive heat generators 31 at both ends, and only the second heat generation portions 35B generates heat. When the voltage is applied to the first electrode 34A, the second electrode 34B, and the third electrode 34C, the resistive heat generators 31 of both the first heat generation portions 35A and the second heat generation portions 35B (i.e., the whole resistive heat generators 31) generate heat. For example, the first heat generation portions 35A alone generates heat to pass the sheet of a relatively small width, such as the sheet of A4 size (sheet width: 210 mm) or a smaller sheet, and the second heat generation portions 35B generates heat together with the first heat generation portions 35A to pass the sheet of a relatively large width, such as a sheet larger than A4 size (sheet width: 210 mm). As a result, the heater 22 can have a heat generation area in accordance with the width of a sheet.

In the present embodiment, the large heat-distribution amount region is provided on the left side with respect to the reference position X0 in FIG. 16 and the small heat-distribution amount region is provided on the right side with respect to the reference position X0 in FIG. 16. In other words, in the present embodiment, the surface area of the conductors disposed on the base 30 is larger in the region on the left side of the reference position X0 in FIG. 16 than in the region on the right side of the reference position X0 in FIG. 16. These conductors refer to the resistive heat generators 31, the power supply lines 33A to 33D, and the electrodes 34A to 34C. In particular, in the present embodiment, the amount of heat of the heater 22 on the left side in FIG. 16 where the two electrodes 34A and 34C are disposed is relatively large, and this side is the large heat-distribution amount region.

Figure 17:
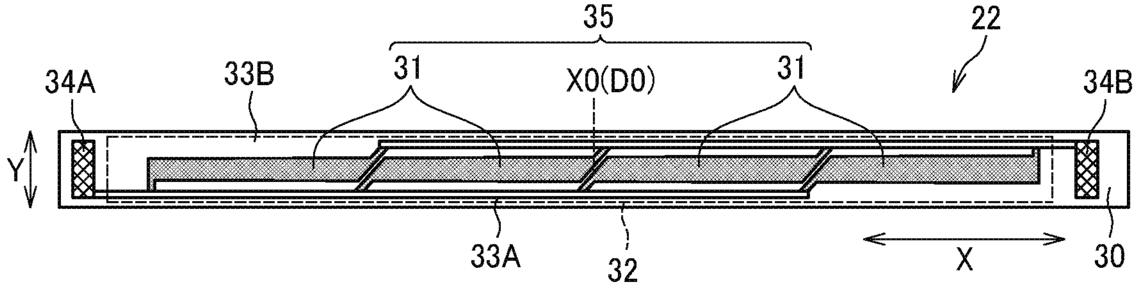
FIG. 17 is yet another plan view of a heater according to yet another modification of an embodiment of the present disclosure.

FIG. 17 is a plan view of a heater according to yet another modification of the present embodiment;

In addition to the configuration in which the large heat-distribution amount region and the small heat-distribution amount region are provided by the difference in the surface area of the electrode portion as illustrated in FIG. 16, the configuration in which the area of the resistive heat generators 31 is not uniform in the conveyance orthogonal direction as illustrated in FIG. 17 may be employed. In other words, with respect to the center position D0 of the heat area D, the resistive heat generator 31 on the right side in FIG. 17 has a larger area than the resistive heat generator 31 on the left side. More specifically, the width of the resistive heat generator 31 in the conveyance direction increases toward the right side in FIG. 17. Further, in the present embodiment, the center position D0 of the heat area D is at the same position as the reference position X0 of the sheet P. With such a configuration, the right side from the reference position X0 in FIG. 17 can be set as the large heat-distribution amount region, and the other side (left side) from the reference position X0 in FIG. 17 can be set as the small heat-distribution amount region.

In each of the above-described heaters 22, the medium detection sensor 29 is disposed in the large heat-distribution amount region and the end thermistor 25A is disposed in the small heat-distribution amount region. By so doing, the fixing failure in the fixing device can be prevented. In the case where the reference position X0 coincides with the center position of the elastic layer 21*b* in the conveyance orthogonal direction as illustrated in FIG. 15, the large heat-distribution amount region and the small heat-distribution amount region may be formed by making the length of the base 30 in a non-uniform manner with respect to the reference position X0 as illustrated in FIG. 9, or the large heat-distribution amount region and the small heat-distribution amount region may be formed by making the surface area of the conductors in a non-uniform manner with respect to the reference position X0 as illustrated in FIG. 16.

The medium detection sensor 29 is preferably disposed upstream from the fixing device 9 in the sheet conveyance direction. As a result, the abnormal condition due to displacement of the sheet in Inconvenience 2 can be detected before the fixing operation of the image with respect to the toner on the sheet is performed by the fixing device 9. As described above, it is it is desired that the medium detection sensor 29 is disposed upstream from the fixing device 9 in the sheet conveyance direction to detect the abnormal condition at the early stage. In particular, as in the present embodiment, it is more preferable that the medium detection sensor 29 is disposed in the sheet feeding device so that the abnormal condition can be detected at the early stage.

Further, since the medium detection sensor 29 is disposed outside the fixing device 9, the medium detection sensor 29 is not replaced when the fixing device 9 is replaced. As a result, the sheet conveyor can achieve a reduction in cost of the device in replacement of the fixing device 9.

It is preferable that the configuration of the present embodiment is applied to the fixing device that includes the fixing belt 20 not having an elastic layer. In other words, such a fixing device have a smaller heat transfer amount in the longitudinal direction of the fixing belt 20, and the insufficient rise in temperature is likely to occur on the end of the fixing belt 20. As a result, it is preferable to apply the above-described configuration of the present embodiment to the fixing device.

Figure 18:
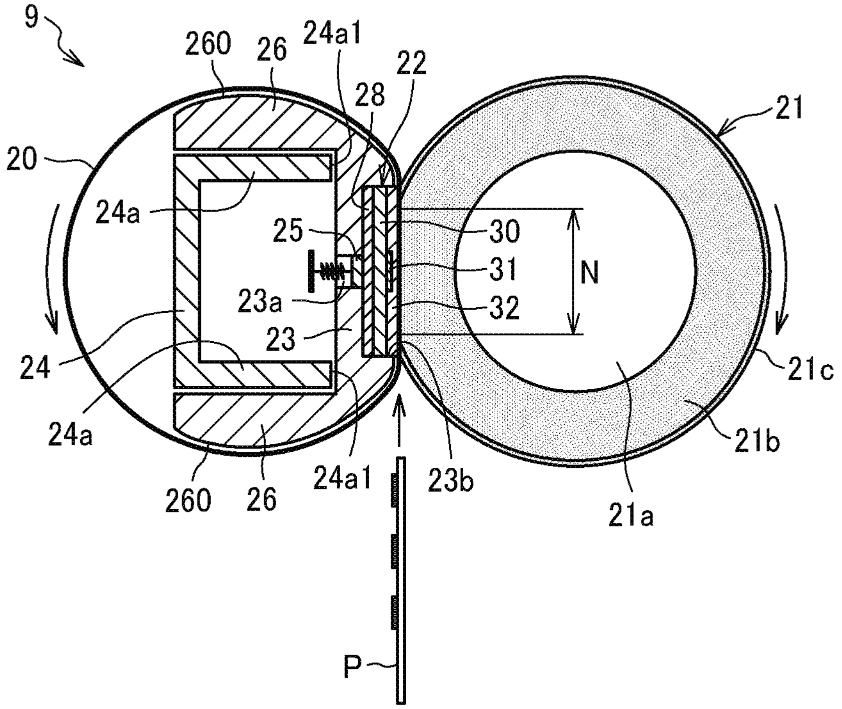
FIG. 18 is a cross-sectional side view of a fixing device including a first high-thermal conduction member, according to an embodiment of the present disclosure.

A description is given of a fixing device including a high-thermal conduction member between the heater holder 23 and the heater 22, according to another embodiment of the present disclosure, with reference to FIG. 18.

The fixing device 9 illustrated in FIG. 18 is different from the fixing device of FIG. 2.

FIG. 18 is a cross-sectional side view of the fixing device 9 including a first high-thermal conduction member 28, according to an embodiment of the present disclosure.

The first high-thermal conduction member 28 is made of a material having a thermal conductivity higher than a thermal conductivity of the base 30. In the present embodiment, the first high-thermal conduction member 28 is a plate made of aluminum. Alternatively, the first high-thermal conduction member 28 may be made of copper, silver, graphene, or graphite, for example. The first high-thermal conduction member 28 having a plate shape can enhance the accuracy of positioning of the heater 22 with respect to the heater holder 23 and the first high-thermal conduction member 28.

A description is now given of a method of calculating the thermal conductivity. In order to calculate the thermal conductivity, the thermal diffusivity of a target object is firstly measured.

The thermal conductivity is calculated using the thermal diffusivity.

The thermal diffusivity was measured using a thermal diffusivity/conductivity measuring device (trade name: AI-PHASE MOBILE 1U, manufactured by Ai-Phase co., ltd.).

In order to convert the thermal diffusivity into thermal conductivity, the values of density and specific heat capacity are to be obtained. The density was measured by a dry automatic densitometer (trade name: ACCUPYC 1330 manufactured by Shimadzu Corporation). The specific heat capacity is measured by a differential scanning calorimeter (trade name: DSC-60 manufactured by Shimadzu Corporation), and sapphire is used as a reference material in which the specific heat capacity is known. In the present embodiment, the specific heat capacity was measured five times, and an average value was calculated and used to obtain the thermal conductivity. A temperature condition was 50° C. The thermal conductivity λ is obtained by the following expression (1).

$$\lambda=\rho\times C\times\alpha \tag{1}$$

where "ρ" is the density, "C" is the specific heat capacity, and "α" is the thermal diffusivity obtained by the thermal diffusivity measurement described above.

As in the above-described embodiment, the image forming apparatus including fixing device according to the present embodiment has Inconveniences 1, 2, and 3. In order to remove Inconveniences 1, 2, and 3, the end thermistors 25A and the center thermistor 25B are disposed to contact the first high-thermal conduction member 28 or the medium detection sensor 29 is disposed, so that Inconveniences 1, 2, and 3 are eliminated and the fixing failure of an image to the sheet can be prevented.

However, the first high-thermal conduction member 28 and a second high-thermal conduction member that is described below may have respective openings similar to the openings 23*a* to press the thermistor 25 and the thermostat against the back face of the base 30. Disposing the first high-thermal conduction member 28 can prevent the temperature unevenness in the longitudinal direction of the heater 22. Accordingly, an inexpensive thermistor having low heat resistance can be used as the thermistor 25.

Figure 19A:
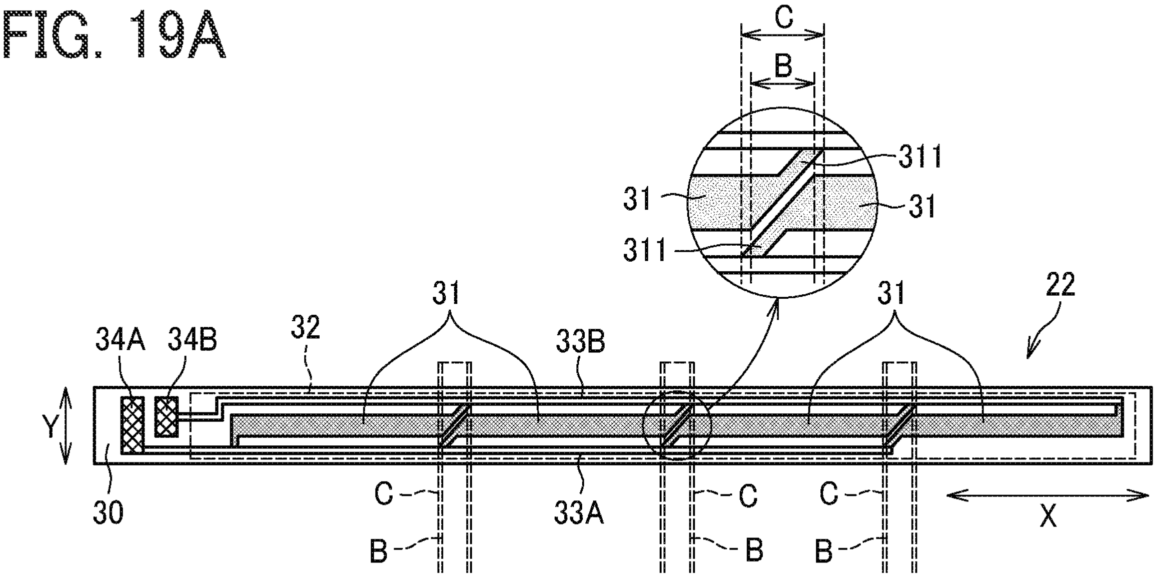
FIG. 19A is a plan view of the heater disposed inside a fixing belt.
Figure 19B:
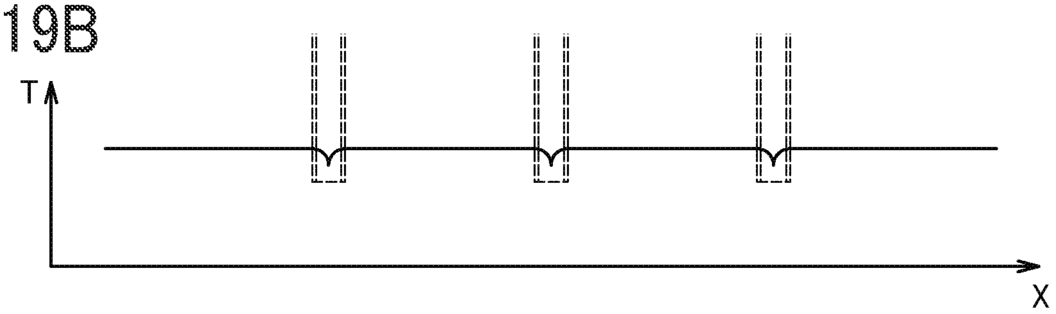
FIG. 19B is a graph illustrating a temperature distribution of the fixing belt in an arrangement direction of the resistive heat generators of the heater of FIG. 19A.

FIGS. 19A and 19B are diagrams illustrating a temperature distribution of the fixing belt 20 in the conveyance orthogonal direction.

FIG. 19A is a plan view of arrangement of the heater 22 disposed inside the fixing belt 20.

FIG. 19B is a graph illustrating a temperature distribution of the fixing belt 20 in the conveyance orthogonal direction of the resistive heat generators 31 of the heater 22 of FIG. 19A.

The vertical axis of FIG. 19B indicates a temperature T and the horizontal axis of FIG. 19B indicates each position of the fixing belt 20 in the conveyance orthogonal direction.

As illustrated in FIGS. 19A and 19B, the plurality of resistive heat generators 31 of the heater 22 are separated from each other in the conveyance orthogonal direction to form separated areas between the adjacent resistive heat generators 31. In other words, the plurality of resistive heat generators 31 are disposed on the heater 22 with spaces B. The range as the separated area is referred to as the space B. The area occupied by the resistive heat generators 31 in the space B is smaller than the area occupied by the resistive heat generators 31 in another area of the heat generation portion, and the amount of heat generated in the space B is smaller than the amount of heat generated in another area of the heat generation portion. As a result, the temperature of the fixing belt 20 corresponding to the space B becomes smaller than the temperature of the fixing belt 20 corresponding to another area, which causes temperature unevenness in the conveyance orthogonal direction of the fixing belt 20. Similar to the space B, the temperature of the heater 22 on an enlarged space C that includes an area around the space B and the temperature of the fixing belt 20 on the enlarged space C are smaller than the temperatures of the heater 22 and the fixing belt 20 on another area of the heat generation portion. The enlarged space C is also referred to as the space C. Similarly, the temperature of the heater 22 on the space B becomes smaller than the temperature of the heater 22 on another area of the heat generation portion.

As illustrated in the enlarged partial view of FIG. 19A, the space B indicates a region in the conveyance orthogonal direction including the entire portion in which the resistive heat generators 31 as heat generation portions of the heater 22 are divided in the conveyance orthogonal direction. In addition to the space B, the heater 22 has the space C including areas corresponding to connection portions 311 of the resistive heat generators 31 and the separation area B as illustrated in the enlarged view of FIG. 19A. The connection portion 311 indicates a portion of the resistive heat generator 31 that extends in the direction intersecting the sheet conveyance direction and is connected to one of the power supply lines 33A and 33B.

Figure 20:
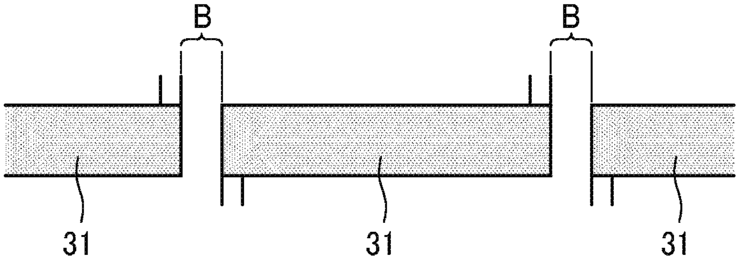
FIG. 20 is a diagram illustrating spaces of the heater of FIG. 5.

FIG. 20 is a diagram illustrating spaces B of the heater of FIG. 5.

As illustrated in FIG. 20, the heater 22 including the rectangular resistive heat generators 31 illustrated in FIG. 5 also has the spaces B having lower temperatures than another area of the heat generation portion.

Figure 21:
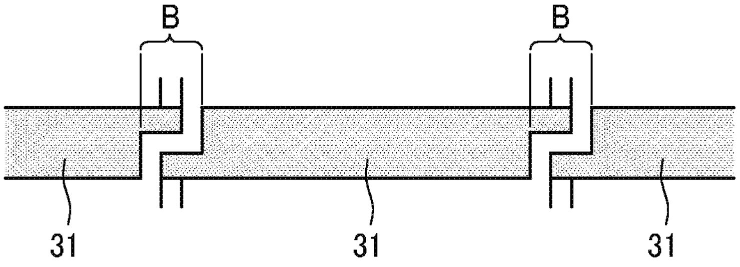
FIG. 21 is a diagram illustrating spaces each having a form different from the form of each of the spaces of FIG. 20.

FIG. 21 is a diagram illustrating spaces B, each having a form different from the form of each of the spaces B of FIG. 20.

In addition, the heater 22 including the resistive heat generators 31 having forms illustrated in FIG. 21 has the spaces B with lower temperatures than another area of the heat generation portion.

Figure 22:
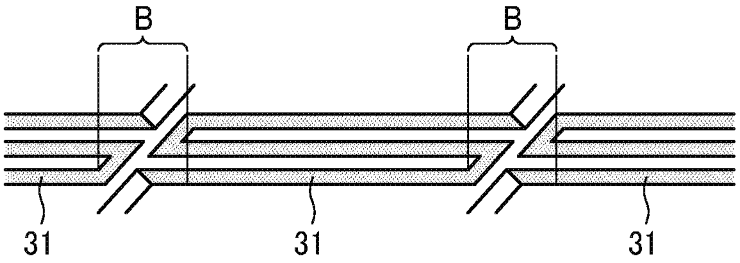
FIG. 22 is a diagram illustrating separated areas of the heater of FIG. 6.

FIG. 22 is a diagram illustrating spaces B of the heater of FIG. 6.

As illustrated in FIG. 22, the heater 22 including the resistive heat generators 31 having forms as illustrated in FIG. 6 has the spaces B with lower temperatures than another area of the heat generation portion. However, overlapping the resistive heat generators 31 lying adjacent to each other in the conveyance orthogonal direction as illustrated in FIGS. 19, 21, and 22 can prevent the above-described insufficient rise in temperature with respect to the other portions in the space B.

In order to prevent the insufficient rise in temperature in the above-descried space and prevent the insufficient rise in temperature in the conveyance orthogonal direction of the fixing belt 20, the fixing device 9 according to the present embodiment includes the first high-thermal conduction members 28. A detailed description is given below of the first high-thermal conduction member 28.

As illustrated in FIG. 18, the first high-thermal conduction member 28 is disposed between the heater 22 and the stay 24 in the left-to-right direction of FIG. 18 and is particularly sandwiched between the heater 22 and the heater holder 23. One side of the first high-thermal conduction member 28 is brought into contact with the back surface of the base 30, and the other side of the first high-thermal conduction member 28 is brought into contact with the heater holder 23.

The stay 24 has two upright portions 24*a* extending in the thickness direction of the heater 22 and each having a contact face 24*a*1 that directly contacts the heater holder 23 to support the heater holder 23, the first high-thermal conduction member 28, and the heater 22. In the sheet conveyance direction (i.e., the vertical direction in FIG. 18), the contact faces 24*a*1 are outside the region in which the resistive heat generators 31 are disposed. The above-described structure prevents heat transfer from the heater 22 to the stay 24 and enables the heater 22 to efficiently heat the fixing belt 20.

Figure 23:
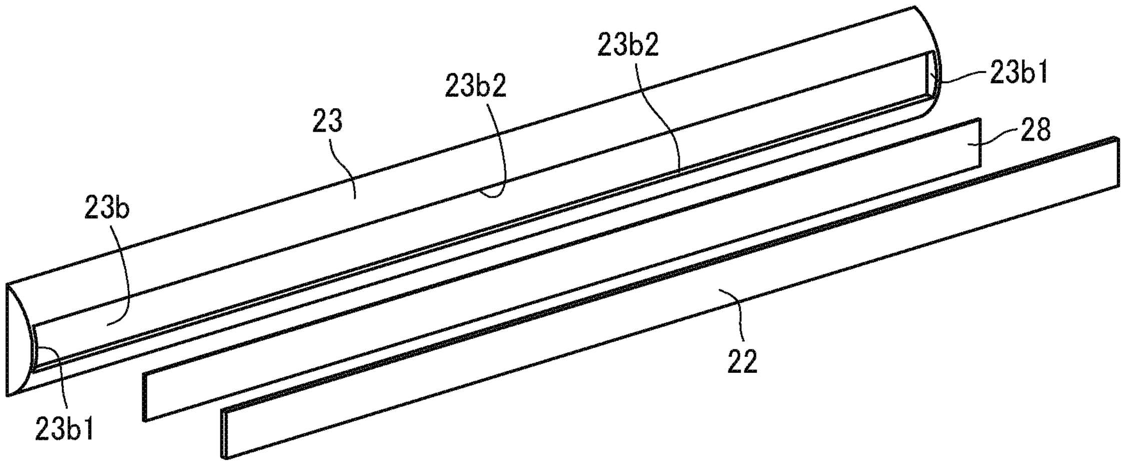
FIG. 23 is a perspective view of the heater, the first high-thermal conduction member, and a heater holder.

FIG. 23 is a perspective view of the heater 22, the first high-thermal conduction member 28, and the heater holder 23.

As illustrated in FIG. 23, the first high-thermal conduction member 28 is a plate having a thickness of 0.3 mm, a length of 222 mm in the conveyance orthogonal direction, and a width of 10 mm in the sheet conveyance direction. In the present embodiment, the first high-thermal conduction member 28 is made of a single plate but may be made of a plurality of members. In FIG. 23, the guide ribs 26 illustrated in FIG. 18 are omitted.

The first high-thermal conduction member 28 is fitted into the recess 23*b* of the heater holder 23, and the heater 22 is mounted on the first high-thermal conduction members 28. Thus, the first high-thermal conduction member 28 is sandwiched and held between the heater holder 23 and the heater 22. In the present embodiment, the width of the first high-thermal conduction members 28 in the conveyance orthogonal direction is substantially same as the width of the heater 22 in the conveyance orthogonal direction. Opposed side walls 23*b*1 of the recess 23*b* extend in the conveyance orthogonal direction form the recess 23*b*. The opposed side walls 23*b*1 restrict movement of the first high-thermal conduction members 28 and movement of the heater 22 in the conveyance orthogonal direction. Reducing the displacement of the first high-thermal conduction members 28 in the conveyance orthogonal direction in the fixing device 9 enhances the thermal conductivity efficiency with respect to a target range in the conveyance orthogonal direction. In addition, opposed side walls 23*b*2 forming the recess 23*b* in the sheet conveyance direction restrict movement of the heater 22 and movement of the first high-thermal conduction member 28 in the sheet conveyance direction. The opposed side walls 23*b*2 serve as regulators in the sheet conveyance direction.

The range in which the first high-thermal conduction member 28 is disposed in the conveyance orthogonal direction is not limited to the above-described range.

Figure 24:
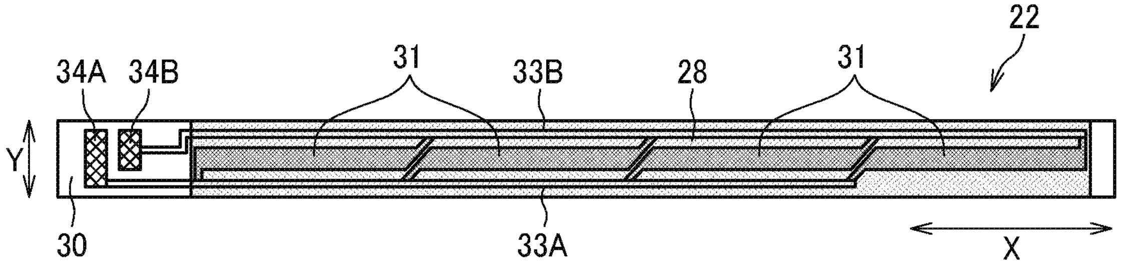
FIG. 24 is a plan view of the heater having a setting of the first high-thermal conduction member.

For example, FIG. 24 is a plan view of the heater 22 having a setting of the first high-thermal conduction member 28.

As illustrated in FIG. 24, the first high-thermal conduction member 28 may be disposed so as to face a range corresponding to the heat generation portion 35 in the conveyance orthogonal direction (see a hatched portion in FIG. 24).

Figure 25:
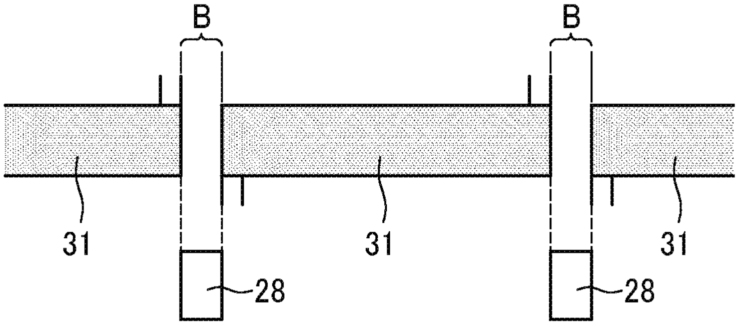
FIG. 25 is a plan view of another heater having a setting of the first high-thermal conduction member different from the setting of the first high-thermal conduction member of the heater of FIG. 24.

Further, FIG. 25 is a plan view of another heater having a setting of the first high-thermal conduction member 28 different from the setting of the first high-thermal conduction member 28 of the heater 22 of FIG. 24.

As illustrated in FIG. 25, the first high-thermal conduction member 28 may face the space B between the resistive heat generators 31 in the conveyance orthogonal direction.

In FIG. 25, for the sake of convenience, the resistive heat generator 31 and the first high-thermal conduction member 28 are shifted in the vertical direction of FIG. 25 but are disposed at substantially the same position in the sheet conveyance direction. However, the present disclosure is not limited to the above-described configuration. The first high-thermal conduction member 28 may be disposed to face a part of the resistive heat generators 31 in the sheet conveyance direction or may be disposed so as to cover the whole resistive heat generators 31 in the sheet conveyance direction as illustrated in FIG. 26.

Figure 26:
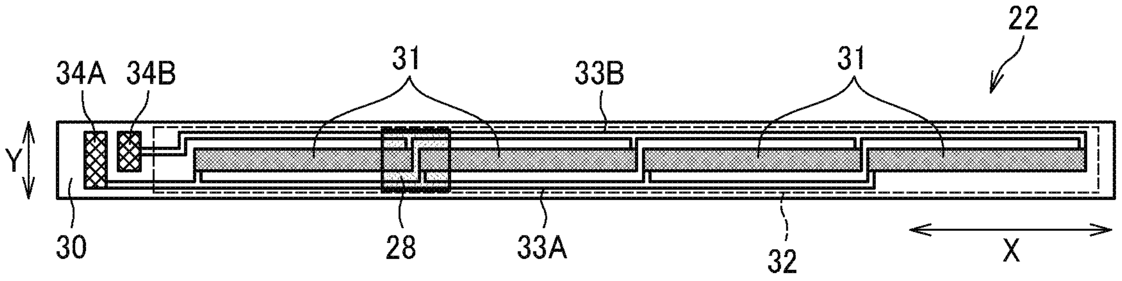
FIG. 26 is a plan view of yet another heater having a setting of the first high-thermal conduction member different from the setting of the first high-thermal conduction member of the heater of FIG. 25.

FIG. 26 is a plan view of yet another heater having a setting of the first high-thermal conduction member different from the setting of the first high-thermal conduction member of the heater of FIG. 25.

As illustrated in FIG. 26, the first high-thermal conduction member 28 may be disposed to face each of the adjacent resistive heat generators 31 with the space B in between in addition to the space B between the adjacent resistive heat generators 31 in the conveyance orthogonal direction. When the first high-thermal conduction members 28 are disposed to face each of the adjacent resistive heat generators 31 with the space B in between, at least a part of the first high-thermal conduction members 28 is overlapped with the positions of the adjacent resistive heat generators 31 in the conveyance orthogonal direction.

The first high-thermal conduction member 28 may be disposed to face the whole spaces B in the heater 22. Alternatively, the first high-thermal conduction member 28 may be disposed to face some spaces B. For example, the first high-thermal conduction member 28 may be disposed to face one space B, as illustrated in FIG. 26. When the first high-thermal conduction member 28 is disposed to face the space B in the conveyance orthogonal direction, at least a part of the first high-thermal conduction member 28 may be overlapped with the space B in the conveyance orthogonal direction.

Due to the pressing force of the pressure roller 21, the first high-thermal conduction member 28 is sandwiched between the heater 22 and the heater holder 23 and is brought into close contact with the heater 22 and the heater holder 23. Bringing the first high-thermal conduction member 28 into contact with the heaters 22 enhances the heat conduction efficiency of the heater 22 in the conveyance orthogonal direction. The first high-thermal conduction member 28 is disposed on the heater 22 facing the space B in the conveyance orthogonal direction. This structure of the heater 22 enhances the heat conduction efficiency in the space B. This structure of the heater 22 increases the amount of heat transmitted to the region of the space B in the conveyance orthogonal direction, and increases the temperature of the part of the heater 22 facing the space B. As a result, the insufficient rise in temperature of the heater 22 in the conveyance orthogonal direction can be prevented. Thus, temperature unevenness of the fixing belt 20 in the conveyance orthogonal direction can be prevented. As a result, the above-described structure of the heater 22 can prevent the fixing unevenness and gloss unevenness in the image fixed on the sheet. Alternatively, the heater 22 does not need to generate additional heat to obtain a sufficient fixing performance in the region of the space B, and energy consumption of the fixing device 9 can be saved. The first high-thermal conduction member 28 disposed over the entire area of the heat generation portion 35 in the conveyance orthogonal direction enhances the heat transfer efficiency of the heater 22 in the main heat area of the heater 22, in other words, over the entire area of the image formation area of the sheet passing through the fixing device, and reduces or prevents the temperature unevenness of the heater 22 and the temperature unevenness of the fixing belt 20 in the conveyance orthogonal direction.

In the present embodiment, the combination of the first high-thermal conduction member 28 and the resistive heat generator 31 having the PTC characteristic described above effectively prevents overheating the non-sheet passing region of the fixing belt 20 when small-size sheets pass through the fixing device 9. Specifically, the PTC characteristic reduces the amount of heat generated by the resistive heat generator 31 in the non-sheet passing region, and the first high-thermal conduction member efficiently transfers heat from the non-sheet passing region in which the temperature rises to a sheet passing region that is a region of the fixing belt contacting the sheet. As a result, the overheating of the non-sheet passing region is effectively prevented.

It is preferable that the first high-thermal conduction member 28 may be disposed opposite an area around the space B because the small heat generation amount in the space B decreases the temperature in the area around the space B. For example, the first high-thermal conduction member 28 facing the enlarged space C (see FIG. 20) particularly enhances the heat transfer efficiency of the space B and the area around the space B in the conveyance orthogonal direction and reduces the temperature unevenness of the heater 22 in the conveyance orthogonal direction. In particular, the first high-thermal conduction member 28 is disposed facing the entire region of the heat generation portion 35 in the conveyance orthogonal direction. This configuration can reduce or prevent the temperature unevenness of the heater 22 (and the fixing belt 20) in the conveyance orthogonal direction.

A description is given of a fixing device according to another embodiment of the present disclosure.

Figure 27:
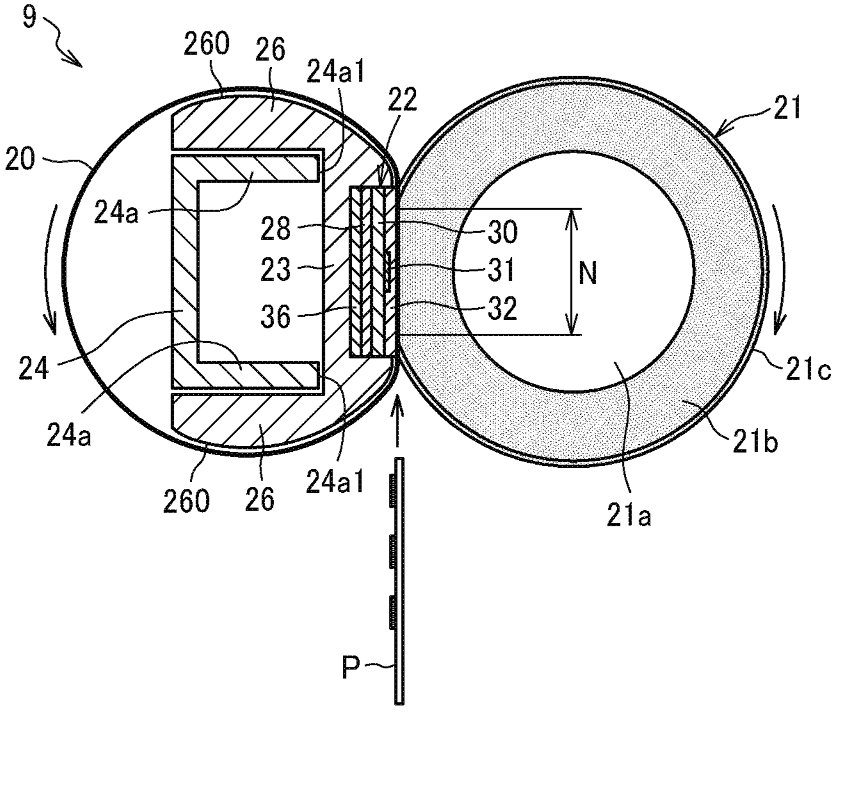
FIG. 27 is a cross-sectional side view of a fixing device according to another embodiment of the present disclosure, different from the fixing device of FIG. 2.

FIG. 27 is a cross-sectional side view of a fixing device according to another embodiment of the present disclosure, different from the fixing device of FIG. 2.

As illustrated in FIG. 27, the fixing device 9 according to the present embodiment includes a second high-thermal conduction member 36 between the heater holder 23 and the first high-thermal conduction member 28. The second high-thermal conduction member 36 is disposed at a position different from the position of the first high-thermal conduction member 28 in the left-to-right direction in FIG. 27 that is a direction in which the heater holder 23, the stay 24, and the first high-thermal conduction member 28 are layered. More specifically, the second high-thermal conduction member 36 is disposed so as to overlap the first high-thermal conduction member 28. FIG. 27 illustrates a schematic cross-sectional view of the fixing device 9 that does not include the thermistor 25 in the conveyance orthogonal direction, which is different from the fixing device 9 illustrated in FIG. 18. In other words, FIG. 27 illustrates a cross-sectional view of the fixing device 9 including the second high-thermal conduction member 36 instead of the thermistor 25.

The second high-thermal conduction member 36 is made of a material having thermal conductivity higher than the thermal conductivity of the base 30, for example, graphene or graphite. In the present embodiment, the second high-thermal conduction member 36 is made of a graphite sheet having a thickness of 1 mm. Alternatively, the second high-thermal conduction member 36 may be a plate made of, for example, aluminum, copper, or silver.

Figure 28:
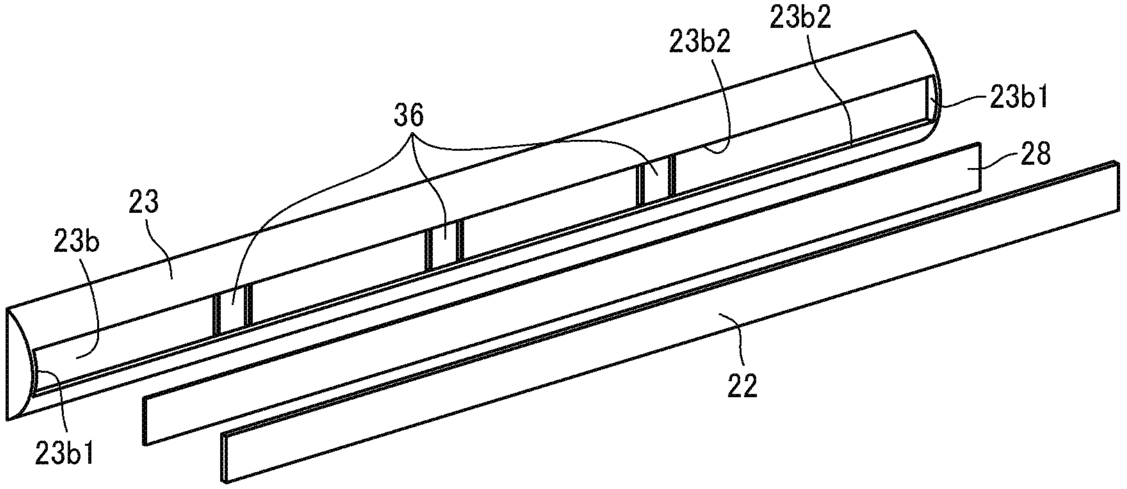
FIG. 28 is a perspective view of the heater, the first high-thermal conduction member, a second high-thermal conduction member, and a heater holder.

FIG. 28 is a perspective view of the heater 22, the first high-thermal conduction member 28, the second high-thermal conduction member 36, and the heater holder 23.

As illustrated in FIG. 28, a plurality of the second high-thermal conduction members 36 are partially disposed on a plurality of portions of the heater holder 23 in the conveyance orthogonal direction. The recess 23*b* of the heater holder 23 has portions deeper than the other areas so that the second high-thermal conduction members 36 are disposed in the portions. Clearances are formed between the heater holder 23 and both sides of the second high-thermal conduction member 36 in the conveyance orthogonal direction. The clearance prevents heat transfer from both ends of the second high-thermal conduction member 36 in the conveyance orthogonal direction to the heater holder 23, and the heater 22 can efficiently heat the fixing belt 20. In FIG. 28, the guide ribs 26 illustrated in FIG. 18 are omitted.

Figure 29:
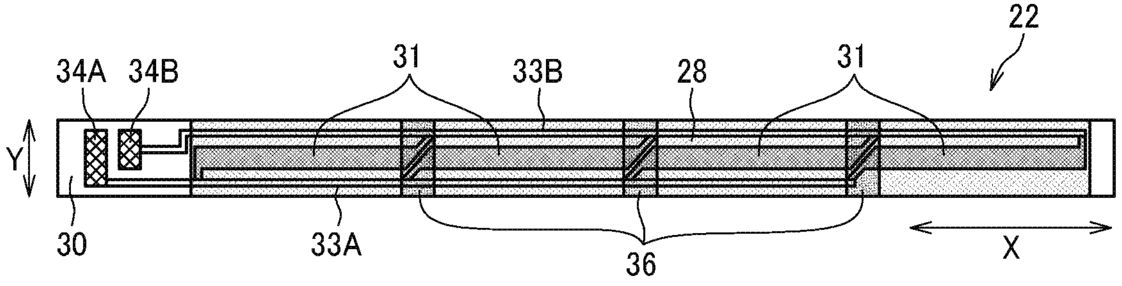
FIG. 29 is a plan view of the heater having a setting of the first high-thermal conduction member and the second high-thermal conduction member.

FIG. 29 is a plan view of the heater 22 having a setting of the first high-thermal conduction member 28 and the second high-thermal conduction members 36.

Figure 33:
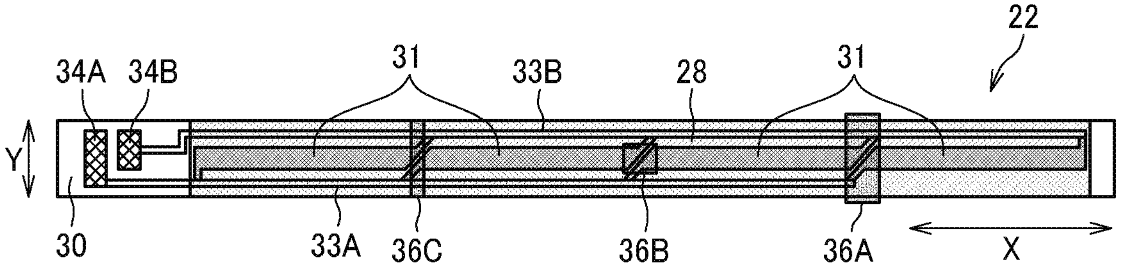
FIG. 33 is a plan view of a heater having a setting of the second high-thermal conduction member different from the setting of the second high-thermal conduction member illustrated in FIG. 29.

As illustrated in FIG. 29, each of the second high-thermal conduction members 36 (see the hatched portions in FIG. 29) is disposed at a position corresponding to the space B in the conveyance orthogonal direction and faces at least a part of each of the adjacent resistive heat generators 31 in the conveyance orthogonal direction. In particular, each of the second high-thermal conduction members 36 in the present embodiment faces the entire space B. In FIG. 29 and FIG. 33 to be described below, the first high-thermal conduction member 28 faces the heat generation portion 35 extending in the conveyance orthogonal direction, but the first high-thermal conduction member 28 according to the present embodiment is not limited this as described above.

The fixing device 9 according to the present embodiment includes the second high-thermal conduction member 36 disposed at the position corresponding to the space B in the conveyance orthogonal direction and the position at which at least a part of each of the adjacent resistive heat generators 31 faces the second high-thermal conduction member 36 in addition to the first high-thermal conduction member 28. The above-described structure particularly enhances the heat transfer efficiency in the space B in the conveyance orthogonal direction and further reduces the temperature unevenness of the heater 22 in the conveyance orthogonal direction.

Figure 30:
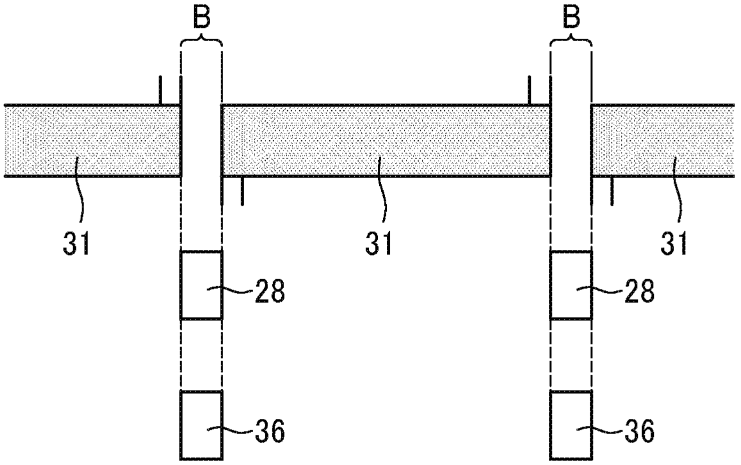
FIG. 30 is a plan view of the heater having another setting of the first high-thermal conduction member and the second high-thermal conduction member.

FIG. 30 is a plan view of the heater 22 having another setting of the first high-thermal conduction members 28 and the second high-thermal conduction members 36.

As illustrated in FIG. 30, the first high-thermal conduction members 28 and the second high-thermal conduction members 36 are disposed opposite the entire spaces B between the resistive heat generators 31. The above-described structure enhances the heat transfer efficiency of the part of the heater 22 corresponding to the space B to be higher than the heat transfer efficiency of the other part of the heater 22. In FIG. 30, for the sake of convenience, the resistive heat generator 31, the first high-thermal conduction member 28, and the second high-thermal conduction member 36 are shifted in the vertical direction of FIG. 30 but are disposed at substantially the same position in the sheet conveyance direction. The present disclosure is not limited to the above-described configuration. The first high-thermal conduction member 28 and the second high-thermal conduction member 36 may be disposed at a part of the resistive heat generators 31 in the sheet conveyance direction.

In one embodiment different from the embodiments described above, each of the first high-thermal conduction member 28 and the second high-thermal conduction member 36 is made of a graphene sheet. The first high-thermal conduction member 28 and the second high-thermal conduction member 36 made of the graphene sheet have high thermal conductivity in a predetermined direction along the plane of the graphene, in other words, not in the thickness direction but in the conveyance orthogonal direction. Accordingly, the above-described structure can effectively reduce the temperature unevenness of the fixing belt in the conveyance orthogonal direction and the temperature unevenness of the heater 22 in the conveyance orthogonal direction.

Figure 31:
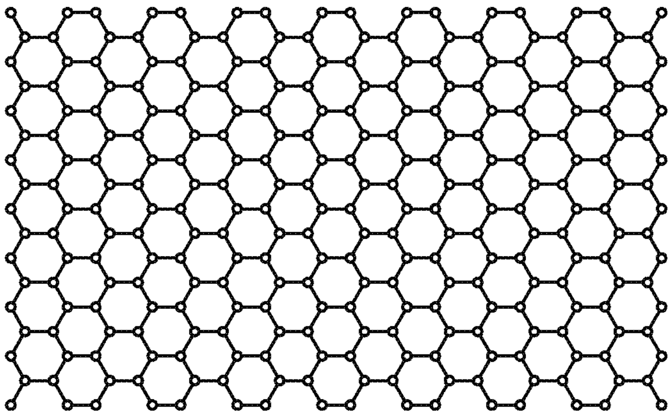
FIG. 31 is a schematic diagram illustrating a two-dimensional atomic crystal structure of graphene.

FIG. 31 is a schematic diagram illustrating a two-dimensional atomic crystal structure of graphene.

Graphene is a flaky powder. Graphene has a planar hexagonal lattice structure of carbon atoms, as illustrated in FIG. 31. Typically, a graphene sheet has a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 32:
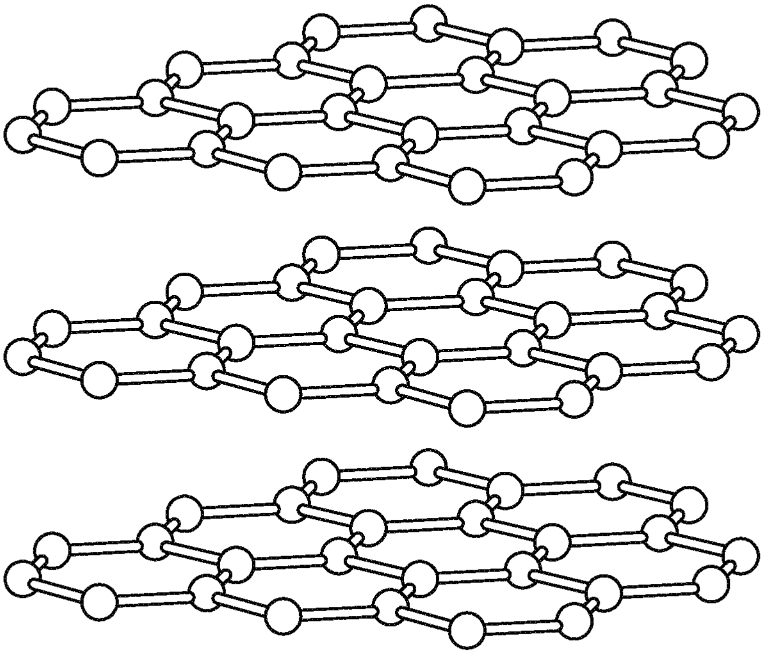
FIG. 32 is a schematic diagram illustrating a three-dimensional atomic crystal structure of graphite.

FIG. 32 is a schematic diagram illustrating a three-dimensional atomic crystal structure of graphite.

Graphite obtained by multilayering graphene has a large thermal conduction anisotropy. As illustrated in FIG. 32, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Accordingly, there is a large anisotropy between the bond between carbon atoms in a layer and the bond between carbon atoms in different layers. In other words, the first high-thermal conduction member 28 and the second high-thermal conduction member 36 that are made of graphite each have the heat transfer efficiency in the conveyance orthogonal direction larger than the heat transfer efficiency in the thickness direction of the first high-thermal conduction member 28 and the second high-thermal conduction member 36 (that is, the stacking direction of these members), reducing the heat transferred to the heater holder 23. Accordingly, the above-described structure can efficiently decrease the temperature unevenness of the heater 22 in the conveyance orthogonal direction and can minimize the heat transferred to the heater holder 23. Since the first high-thermal conduction member 28 and the second high-thermal conduction member 36 that are made of graphite are not oxidized at about 700 degrees or lower, the first high-thermal conduction member 28 and the second high-thermal conduction member 36 each have an excellent heat resistance.

The physical properties and dimensions of the graphite sheet may be appropriately changed according to the function required for the first high-thermal conduction member 28 or the second high-thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high-thermal conduction member 28 or a width of the second high-thermal conduction member 36 in the conveyance orthogonal direction may be increased in response to a large width of the fixing nip region N or a large width of the heater 22.

From the viewpoint of increasing mechanical strength, the number of layers of the graphite sheet is preferably 11 or more. The graphite sheet may partially include a single layer portion and a multilayer portion.

As long as the second high-thermal conduction member 36 faces a part of each of adjacent resistive heat generators 31 and at least a part of the space B (and the space C) between the adjacent resistive heat generators 31 in the conveyance orthogonal direction, the configuration of the second high-thermal conduction member 36 is not limited to the configuration illustrated in FIG. 29.

For example, FIG. 33 is a plan view of a heater having a setting of a second high-thermal conduction member 36A different from the setting of the second high-thermal conduction member 36 illustrated in FIG. 29.

As illustrated in FIG. 33, the second high-thermal conduction member 36A is longer than the base 30 in the sheet conveyance direction, and both ends of the second high-thermal conduction member 36A in the sheet conveyance direction are outside the base 30 in FIG. 33. A second high-thermal conduction member 36B is disposed facing a range in which the resistive heat generator 31 is disposed in the sheet conveyance direction. A second high-thermal conduction member 36C is disposed in a part of the space and a part of each of adjacent resistive heat generators 31.

Figure 34:
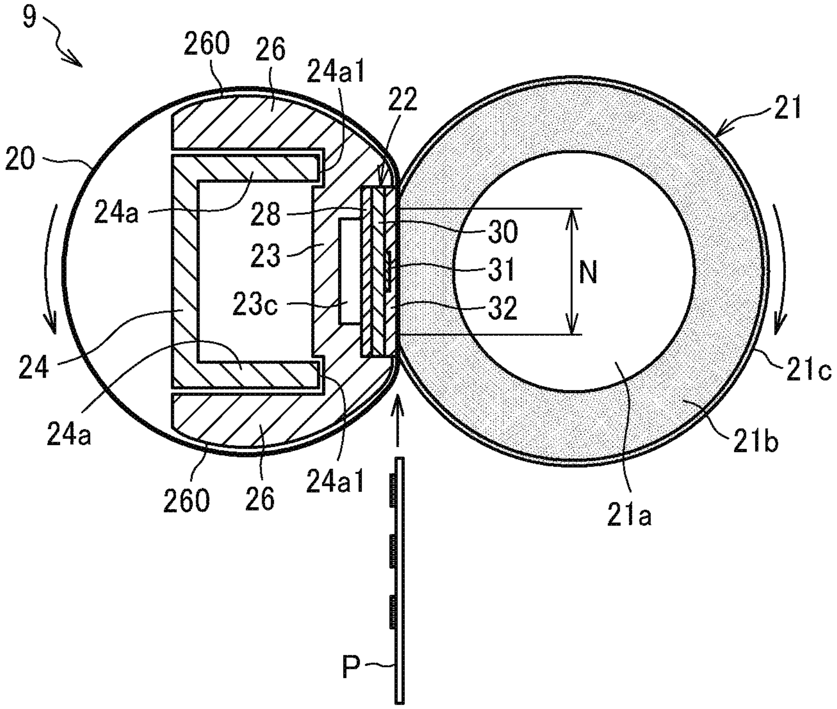
FIG. 34 is a cross-sectional side view of a fixing device according to another embodiment of the present disclosure, different from the fixing devices of FIGS. 2 and 27.

FIG. 34 is a cross-sectional side view of the fixing device 9 according to another embodiment of the present disclosure, different from the fixing devices of FIGS. 2 and 27.

As illustrated in FIG. 34, the fixing device 9 according to the present embodiment has a gap between the first high-thermal conduction member 28 and the heater holder 23 in the thickness direction that is the left-to-right direction in FIG. 34. In other words, the fixing device 9 has a gap 23*c* serving as a thermal insulation layer. In the conveyance orthogonal direction, the gap 23*c* is in a portion included in the recess 23*b* (see FIG. 28) in the heater holder 23 to set the heater 22, the first high-thermal conduction member 28, and the second high-thermal conduction member 36, but the second high-thermal conduction member 36 is not set in the portion of the gap 23*c*. In the sheet conveyance direction, the gap 23*c* is in a portion of the recess 23*b* having a depth deeper than other portions to receive the first high-thermal conduction member 28. The portion in the recess 23*b* is the partial or entire portion other than the portion in which the second high-thermal conduction members 36 are disposed in the conveyance orthogonal direction and the portion in the sheet conveyance direction. The above-described structure minimizes the contact area between the heater holder 23 and the first high-thermal conduction member 28. Minimizing the contact area prevents heat transfer from the first high-thermal conduction member 28 to the heater holder 23 and enables the heater 22 to efficiently heat the fixing belt 20.

In the cross section of the fixing device 9 in which the second high-thermal conduction member 36 is set in the conveyance orthogonal direction, the second high-thermal conduction member 36 contacts the heater holder 23 as illustrated in FIG. 27 of the above-described embodiment.

In particular, the fixing device 9 according to the present embodiment has the gap 23*c* facing the entire area of the resistive heat generators 31 in the sheet conveyance direction that is the vertical direction in FIG. 34. The gap 23*c* prevents heat transfer from the first high-thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high-thermal conduction member 36 is a member different from the first high-thermal conduction member 28, but the present embodiment is not limited to this configuration. For example, the first high-thermal conduction member 28 may have a thicker portion than the other portion so that the thicker portion faces the space B.

Figure 35:
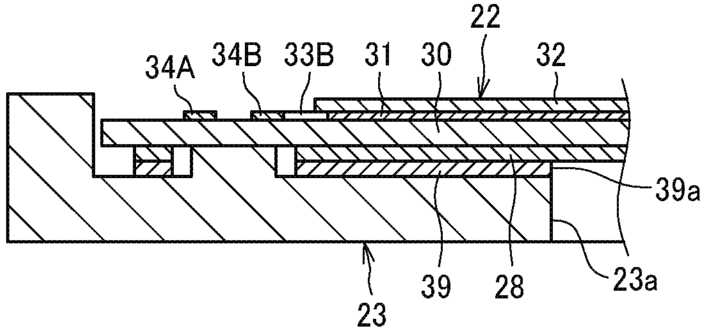
FIG. 35 is a partial cross-sectional view of the fixing device including the first high-thermal conduction member disposed between a heat insulator and the heater.

FIG. 35 is a partial cross-sectional view of the fixing device 9 including the first high-thermal conduction member 28 disposed between a heat insulator 39 and the heater 22.

As illustrated in FIG. 35, the fixing device 9 may include the heat insulator 39 between the first high-thermal conduction members 28 and the heater holder 23. As illustrated in FIG. 35, the thermistor 25 contacts the first high-thermal conduction members 28 via the opening 23*a* of the heater holder 23 and an opening 39*a* of the heat insulator 39.

Like the above-described embodiments, the image forming apparatus including the fixing device 9 according to the embodiment illustrated in FIG. 27, 34, or 35 can remove Inconveniences 1, 2, and 3 by disposing the end thermistor 25A, the center thermistor 25B, and the medium detection sensor 29, and can prevent the fixing failure of the image to the sheet.

The above-described embodiments are illustrative and do not limit the present disclosure. It is therefore to be understood that within the scope of the appended claims, numerous additional modifications and variations are possible to this disclosure otherwise than as specifically described herein.

Figure 36:
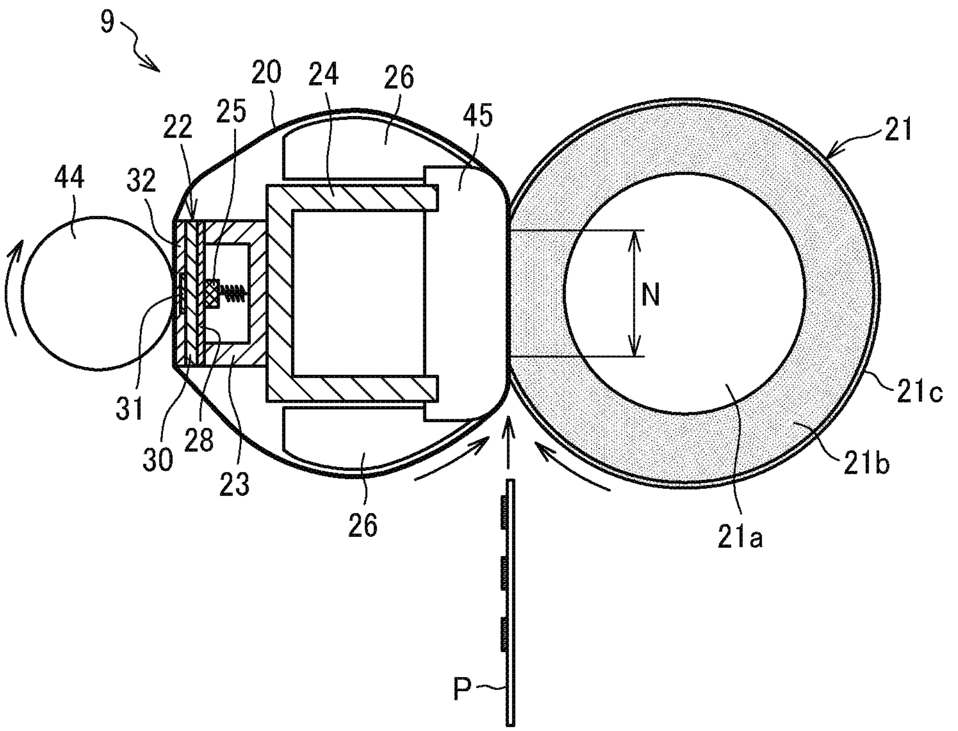
FIG. 36 is a cross-sectional side view of a fixing device different from the fixing devices of FIGS. 2, 27, and 35.
Figure 37:
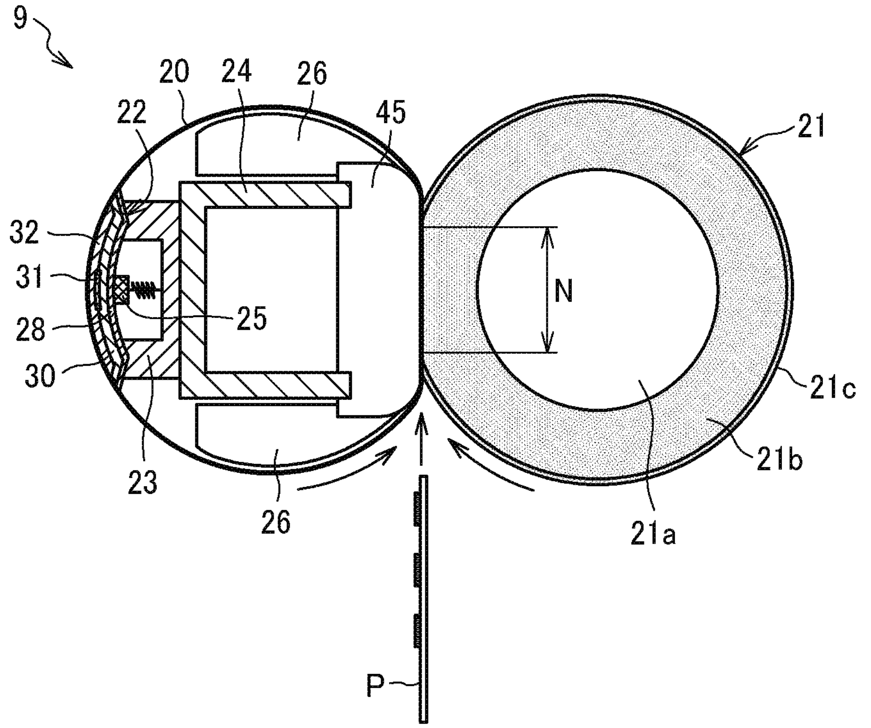
FIG. 37 is a cross-sectional side view of a fixing device different from the fixing devices of FIGS. 2, 27, 35, and 36.
Figure 38:
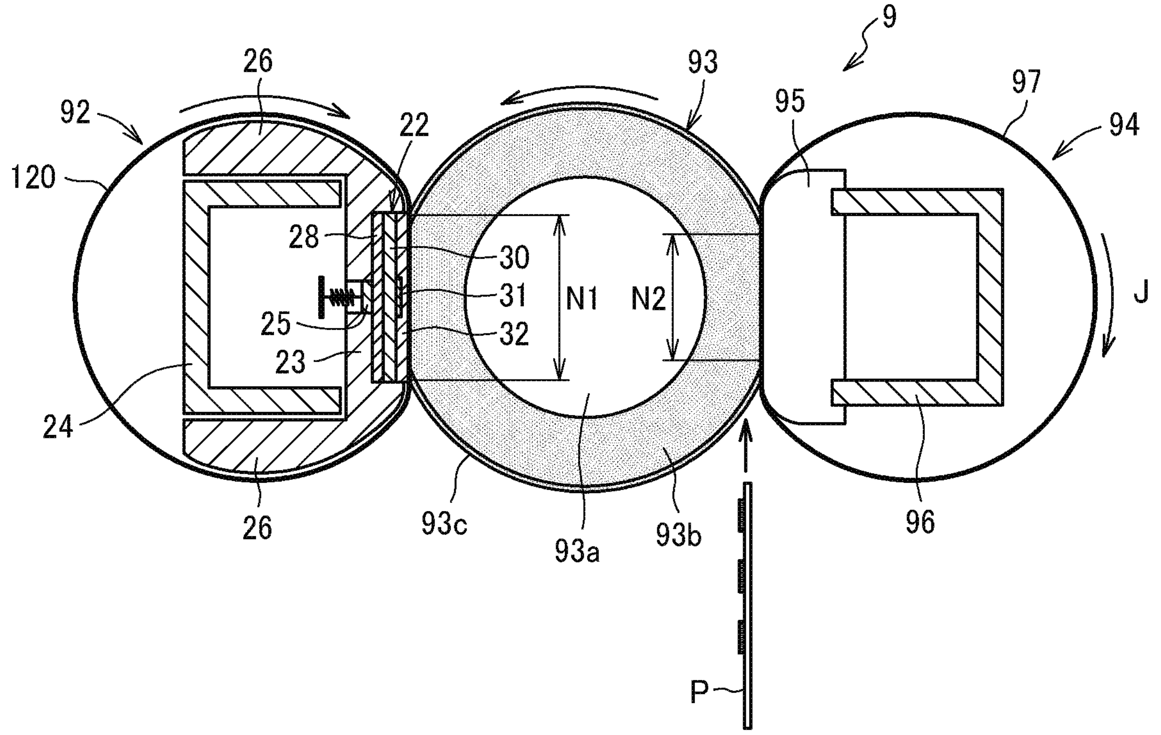
FIG. 38 is a cross-sectional side view of a fixing device different from the fixing devices of FIGS. 2, 27, 35, 36, and 37.

The embodiments of the present disclosure are also applicable to fixing devices as illustrated in FIGS. 36, 37, and 38, respectively, in addition to the fixing device 9 described above. Following descriptions are given of the configurations of the fixing devices illustrated in FIGS. 36, 37, and 38.

First, the configuration of the fixing device 9 is described below, with reference to FIG. 36.

FIG. 36 is a cross-sectional side view of the fixing device 9 different from the fixing devices of FIGS. 2, 27, and 35.

The fixing device 9 illustrated in FIG. 36 includes a pressure roller 44 opposite the pressure roller 21 with respect to the fixing belt 20. The pressure roller 44 is a counter rotator that rotates at the position facing the fixing belt 20 serving as a rotator. The fixing belt 20 is sandwiched by the pressure roller 44 and the heater 22 and is heated by the heater 22. On the other hand, a nip formation pad 45 serving as a nip former is disposed on the inner circumference of the fixing belt 20, in other words, inside the loop formed by the fixing belt 20. The nip formation pad 45 is disposed proximate to the pressure roller 21. The nip formation pad 45 is supported by the stay 24. The nip formation pad 45 sandwiches the fixing belt 20 together with the pressure roller 21, thereby forming the fixing nip region N.

A configuration of the fixing device 9 is described below, with reference to FIG. 37.

FIG. 37 is a cross-sectional side view of the fixing device 9 different from the fixing devices 9 of FIGS. 2, 27, 35, and 36.

The fixing device 9 illustrated in FIG. 37 does not include the pressure roller 44 illustrated in FIG. 36. In order to attain a contact length for which the heater 22 contacts the fixing belt 20 in the circumferential direction of the fixing belt 20, the heater 22 is curved into an arc in cross section that corresponds to a curvature of the fixing belt 20. Other parts of the fixing device 9 illustrated in FIG. 37 are the same as the fixing device 9 illustrated in FIG. 36.

Lastly, the configuration of the fixing device 9 is described below, with reference to FIG. 38.

FIG. 38 is a cross-sectional side view of the fixing device 9 different from the fixing devices of FIGS. 2, 27, 35, 36, and 37.

The fixing device 9 includes a heating assembly 92, a fixing roller 93 that is a fixing member, and a pressure assembly 94 that is a counter member. The heating assembly 92 includes the heater 22, the first high-thermal conduction member 28, the heater holder 23, the stay 24, which are described in the above embodiments, and a heating belt 120 as a rotator. The fixing roller 93 is a counter rotator that rotates and faces the heating belt 120 as a rotator. The fixing nip region N1 is formed between the fixing roller 93 and the heating belt 120. The fixing roller 93 includes a core 93*a*, an elastic layer 93*b*, and a release layer 93*c*. The core 93*a* is a solid core made of iron. The elastic layer 93*b* coats the surface of the core 93*a*. The release layer 93*c* coats an outer circumferential face of the elastic layer 93*b*. The pressure assembly 94 is disposed opposite to the heating assembly 92 with respect to the fixing roller 93. The pressure assembly 94 includes a nip formation pad 95 and a stay 96 inside the loop of a pressure belt 97. The pressure belt 97 is rotatably arranged to wrap around the nip formation pad 95 and the stay 96. The sheet P passes through the fixing nip region N2 between the pressure belt 97 and the fixing roller 93 to be heated and pressed to fix the image onto the sheet P. The pressure belt 37 rotates in the direction indicated by arrow J in FIG. 38.

As described above, the image forming apparatus provided with the fixing devices 9 illustrated in FIGS. 36, 37, and 38 include the end thermistor 25A, the center thermistor 25B, and the medium detection sensor 29. By so doing, Inconveniences 1, 2, and 3 can be removed, and the fixing failure of an image to a sheet can be prevented.

Further, the apparatus provided with the sheet conveyor including the first temperature sensor, the second temperature sensor, and the recording medium sensor, according to the present disclosure is not limited to the image forming apparatus according to the above embodiment. In other words, the apparatus applicable to the present disclosure may be an image forming apparatus including a drying device to dry ink applied on a sheet, a laminator that thermally presses a film as a covered object to the surface of a sheet such as a paper, or a heating device, for example, a thermocompression device such as a heat sealer that seals a sealing portion of a packaging material with heat and pressure.

Applying the present disclosure to the sheet conveyor provided for the above-described apparatuses can reduce or prevent the heating failure of a recording medium.

The image forming apparatus according to the embodiments of the present disclosure is not limited to the color image forming apparatus as illustrated in FIG. 1. Alternatively, the image forming apparatus may be a monochrome image forming apparatus that forms monochrome images on recording media. The image forming apparatus may be, e.g., a copier, a printer, a scanner, a facsimile machine, or a multifunction peripheral (MFP) having at least two of copying, printing, scanning, and facsimile functions.

Figure 39:
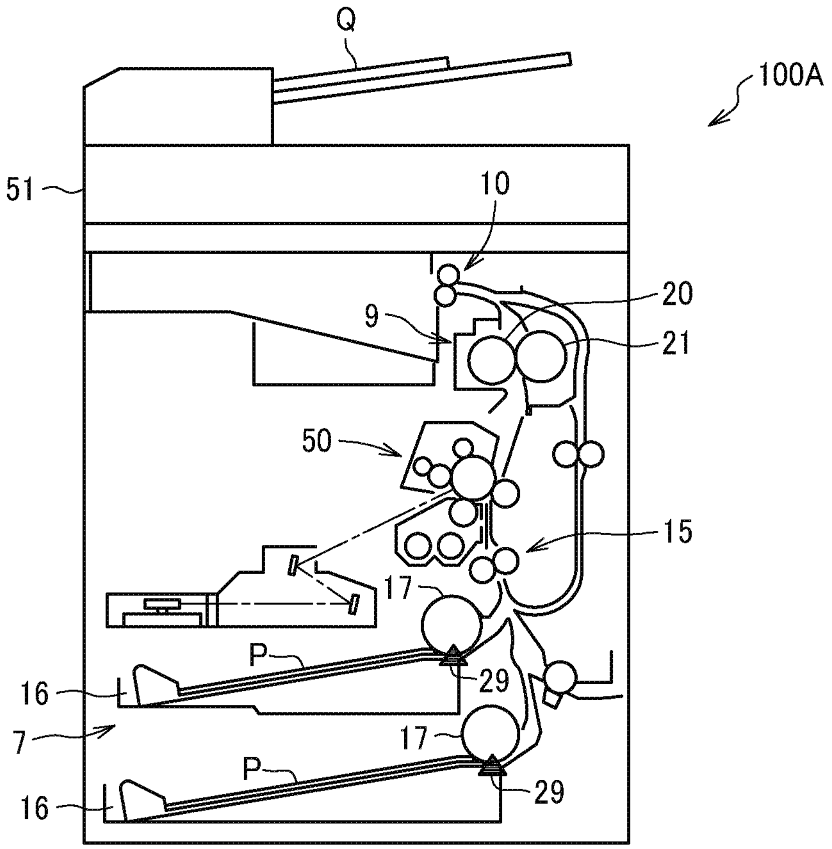
FIG. 39 is a diagram illustrating a schematic configuration of an image forming apparatus according to an embodiment of the present disclosure, different from the image forming apparatus of FIG. 1.

For example, FIG. 39 is a diagram illustrating a schematic configuration of an image forming apparatus 100A according to an embodiment of the present disclosure, different from the image forming apparatus 100 of FIG. 1.

As illustrated in FIG. 39, the image forming apparatus 100A according to the present embodiment includes an image forming device 50 including, for example, a photoconductor drum, the sheet conveyance unit including, for example, a timing roller pair 15, the sheet feeding device 7, the fixing device 9, the sheet ejection device 10, and a reading device 51. The sheet feeding device 7 includes the plurality of sheet trays 16, the medium detection sensors 29, and the sheet feed rollers 17. The plurality of sheet trays 16 accommodate sheets of different sizes, respectively. The medium detection sensors 29 and the sheet feed rollers 17 are disposed corresponding to the number of the sheet trays 16.

In the present embodiment, the medium detection sensor 29 is disposed inside the sheet tray 16. However, the medium detection sensor 29 may be disposed at a position proximate to and upstream from the timing roller pair 15 in the sheet conveyance passage in the sheet conveyance direction.

The reading device 51 reads an image of an original document Q. The reading device 51 generates image data from the read image. The sheet feeding device 7 accommodates the plurality of sheets P and feeds the sheet P to the sheet conveyance passage. The timing roller pair 15 conveys the sheet P on the sheet conveyance passage to the image forming device 50.

The image forming device 50 forms a toner image on the sheet P. Specifically, the image forming device 50 includes the photoconductor drum, a charging roller, an exposure device, a developing device, a supply device, a transfer roller, a cleaning device, and a charge neutralizing device. The toner image is, for example, an image of the original document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100A.

A description is now given of the fixing device 9 according to the present embodiment. Descriptions of the configurations common to the fixing devices of the above-described embodiments are omitted as appropriate.

Figure 40:
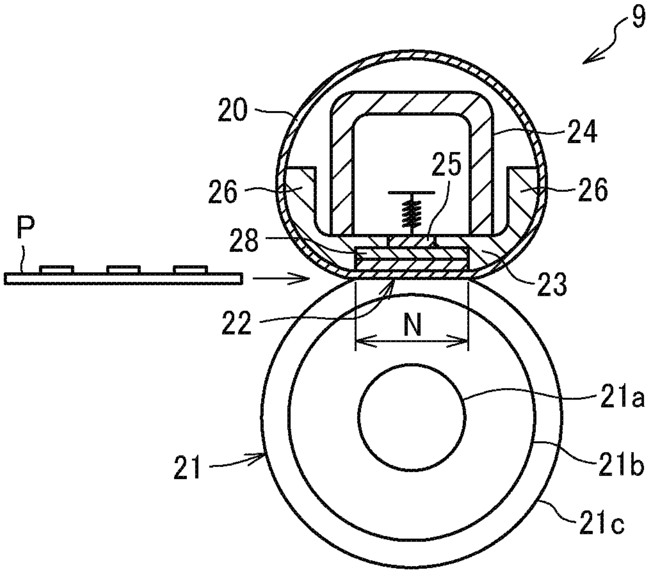
FIG. 40 is a cross-sectional side view of a fixing device according to an embodiment of the present disclosure.

FIG. 40 is a cross-sectional side view of the fixing device 9 according to an embodiment of the present disclosure.

As illustrated in FIG. 40, the fixing device 9 includes the fixing belt 20, the pressure roller 21, the heater 22, the heater holder 23, the stay 24, the thermistors 25, and the first high-thermal conduction member 28.

The fixing nip region N is formed between the fixing belt 20 and the pressure roller 21. The nip width of the fixing nip region N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the solid iron core 21*a*, the elastic layer 21*b*, and the release layer 21*c*. The pressure roller 21 has an outer diameter of 24 mm to 30 mm, and the elastic layer 21*b* has a thickness of 3 mm to 4 mm.

The heater 22 includes a base, a thermal insulation layer, a conductor layer including, for example, resistive heat generator, and an insulation layer, and is formed to have a thickness of 1 mm as a whole. The width corresponding to the vertical direction Y (see FIG. 41) of the heater 22 in the sheet conveyance direction is, for example, 13 mm.

Figure 41:
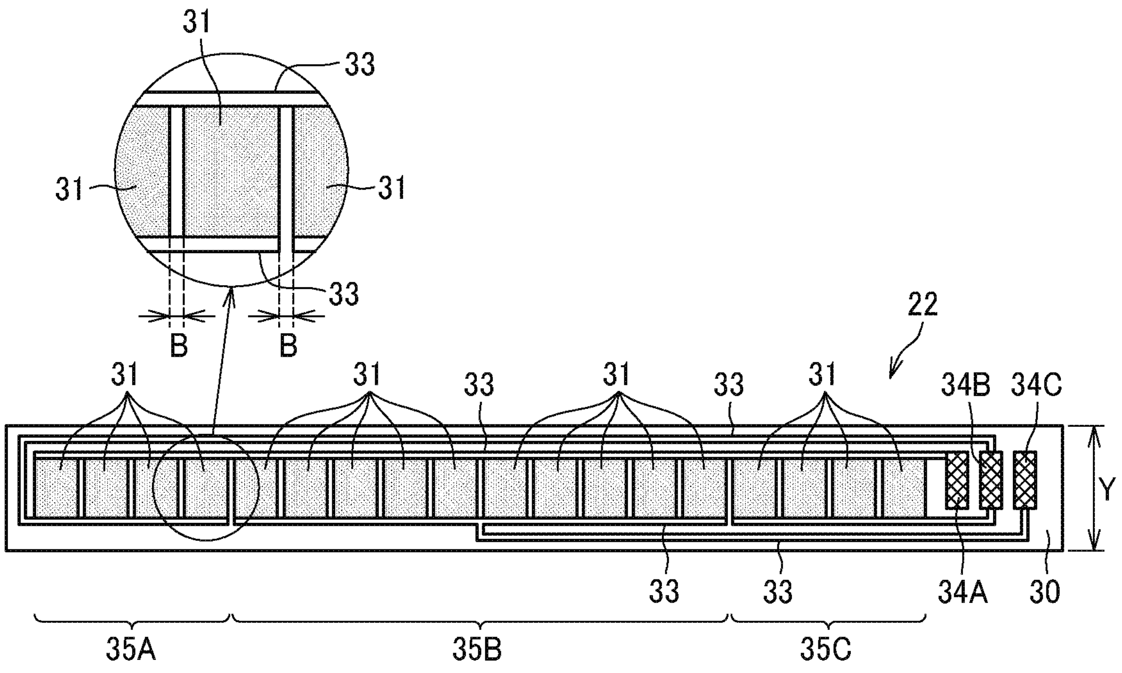
FIG. 41 is a plan view of the heater in the fixing device of FIG. 40.

FIG. 41 is a plan view of the heater 22 in the fixing device 9 of FIG. 40.

As illustrated in FIG. 41, the conductor layer of the heater 22 includes the plurality of resistive heat generators 31, the power supply lines 33, and the electrodes 34A to 34C. As illustrated in the enlarged view in FIG. 41, the space B is also formed in the present embodiment as a separated area between adjacent resistive heat generators of the plurality of resistive heat generators 31 arranged in the conveyance orthogonal direction. The enlarged view of FIG. 41 illustrates two spaces B, but the space B is formed between adjacent resistive heat generators of the whole resistive heat generators 31. The resistive heat generators 31 are grouped to three heat generation portions 35A to 35C. When a current flows between the electrodes 34A and 34B, the heat generation portions 35A and 35C generate heat. When a current flows between the electrodes 34A and 34C, the second heat generation portion 35B generates heat. When the fixing device 9 fixes the toner image onto the small-size sheet, the second heat generation portion 35B generates heat. When the fixing device 9 fixes the toner image onto the large-size sheet, the whole heat generation portions 35A to 35C generate heat.

Figure 42:
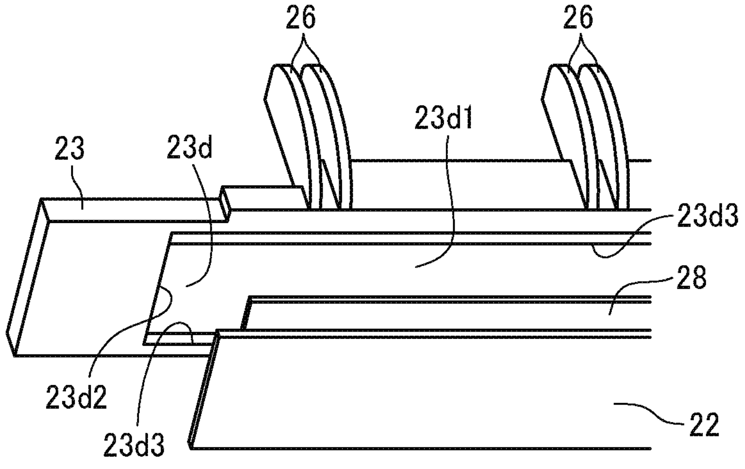
FIG. 42 is a perspective view of the heater and the heater holder.

FIG. 42 is a perspective view of the heater and the heater holder.

As illustrated in FIG. 42, the heater holder 23 holds the heater 22 and the first high-thermal conduction member 28 in a recess 23*d*. The recess 23*d* is formed on the side of the heater holder 23 facing the heater 22. The recess **23*d* has a bottom face 23*d*1 and walls 23*d*2 and 23*d*3. The bottom face 23*d*1 is substantially parallel to the base 30 and is recessed from the side of the heater holder 23 of the heater 22 toward the stay 24. The walls 23*d*2 are opposed side faces of the recess 23*d* in the conveyance orthogonal direction and are formed inside the heater holder 23. The recess 23*d* may have one wall 23*d*2. The walls 23*d*3 are opposed side faces of the recess 23*d* in the sheet conveyance direction and are formed inside the heater holder 23. The heater holder 23 has the guide ribs 26. The heater holder 23** is made of LCP.

Figure 43:
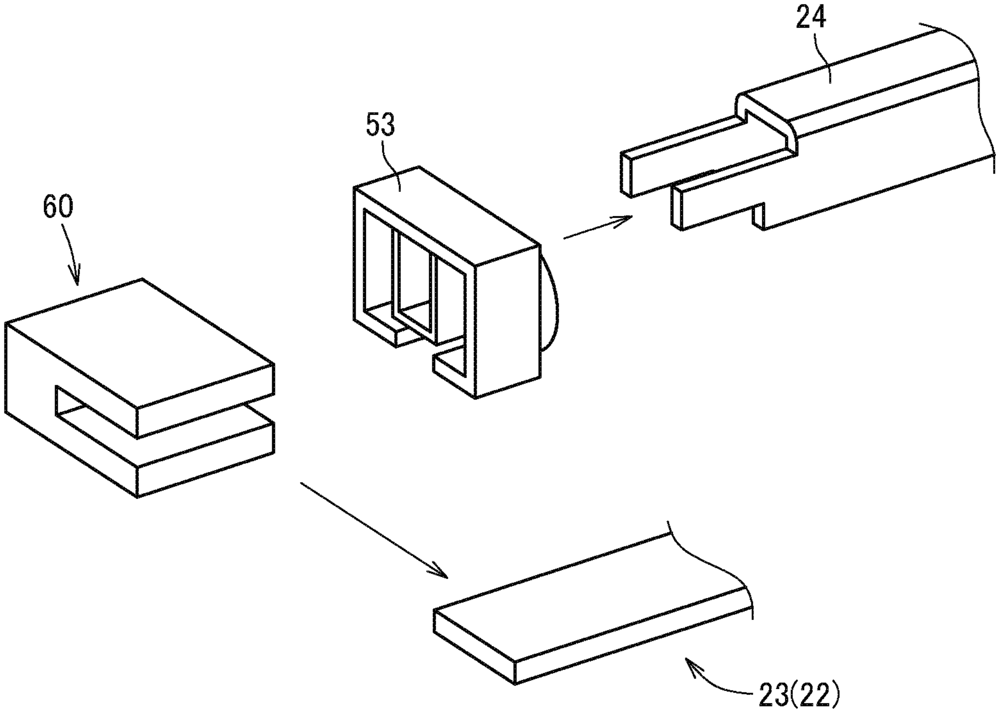
FIG. 43 is a perspective view of a connector attached to the heater.

FIG. 43 is a perspective view of a connector attached to the heater.

As illustrated in FIG. 43, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively, and the heat generation portions 35 are electrically coupled to the power supply provided in the image forming apparatus via the connector 60. The above-described configuration enables the power supply to supply power to the heat generation portions 35. At least a part of each of the electrodes 34A to 34C is not coated by the insulation layer, in other words, is exposed to secure connection with the connector 60.

A flange 53 contacts the inner circumferential face of the fixing belt 20 at each end of the fixing belt 20 in the conveyance orthogonal direction to hold the fixing belt 20. The flange 53 is fixed to the housing of the fixing device 9. The flange 53 is inserted into each end of the stay 24 (see the direction indicated by arrow from the flange 53 in FIG. 43).

To attach to the heater 22 and the heater holder 23, the connector 60 is moved in the sheet conveyance direction (see the direction indicated by arrow from the connector 60 in FIG. 43). The connector 60 and the heater holder 23 may have a projection and a recess to attach the connector 60 to the heater holder 23. The convex portion disposed on one of the connector 60 and the heater holder 23 is engaged with the recess disposed on the other of the connector 60 and the heater holder 23 and relatively move in the recess to attach the connector 60 to the heater holder 23. The connector 60 is attached to one end of the heater 22 and one end of the heater holder 23 in the conveyance orthogonal direction. The one end of the heater 22 and the one end of the heater holder 23 are farther from a portion in which the pressure roller 21 receives a driving force from a drive motor than the other end of the heater 22 and the other end of the heater holder 23, respectively.

Figure 44:
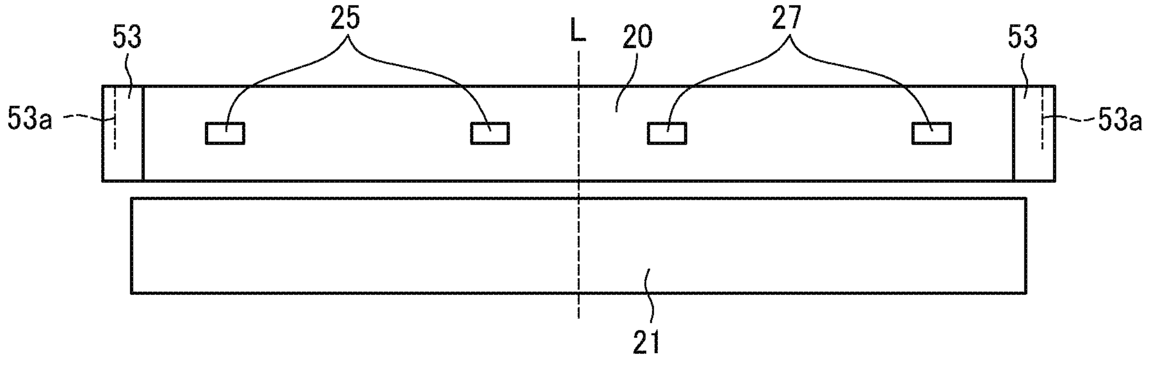
FIG. 44 is a schematic diagram illustrating a setting of thermistors and thermostats.

FIG. 44 is a schematic diagram illustrating a setting of thermistors 25 and thermostats.

As illustrated in FIG. 44, on the left side of FIG. 44 with respect to the center line L, one thermistor 25 faces the center portion of the inner circumferential face of the fixing belt 20 in the conveyance orthogonal direction, and another thermistor 25 faces an end of the inner circumferential face of the fixing belt 20 in the conveyance orthogonal direction. The heater 22 is controlled based on the temperature of the center portion of the fixing belt 20 and the temperature of the end of the fixing belt 20 in the conveyance orthogonal direction that are detected by the thermistors 25.

As illustrated in FIG. 44, on the right side of FIG. 44 with respect to the center line L, one thermostat 27 faces the center portion of the inner circumferential face of the fixing belt 20 in the conveyance orthogonal direction, and another thermostat 27 faces an end of the inner circumferential face of the fixing belt 20 in the conveyance orthogonal direction. Each of the thermostats 27 shuts off a current to the heater 22 in response to a detection of a temperature of the fixing belt 20 higher than a predetermined threshold value.

Flanges 53 are disposed at both ends of the fixing belt 20 in the conveyance orthogonal direction and hold both ends of the fixing belt 20, respectively. The flange 53 is made of LCP.

Figure 45:
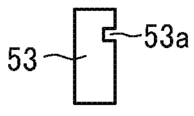
FIG. 45 is a diagram illustrating a groove of a flange.

FIG. 45 is a diagram illustrating a groove of a flange 53.

As illustrated in FIG. 45, the flange 53 has a slide groove **53*a*. The slide groove 53*a* extends in a direction in which the fixing belt 20 moves toward and away from the pressure roller 21. An engaging portion of the housing of the fixing device 9 is engaged with the slide groove 53*a*. The relative movement of the engaging portion in the slide groove 53*a* enables the fixing belt 20 to move toward and away from the pressure roller 21**.

In the image forming apparatus including the fixing device 9, Inconveniences 1, 2, and 3 can be removed by disposing the end thermistor 25A, the center thermistor 25B, and the medium detection sensor 29 as in the fixing device 9 according to the above-described embodiment, and the fixing failure of the image to the sheet can be prevented.

The sheet P serving as a recording medium may be, for example, a sheet of plain paper, thick paper, thin paper, postcard, envelope, coated paper, art paper, tracing paper, overhead projector (OHP) sheet, plastic film, prepreg, or copper foil.

The terms "detection" and "sense" used here in the present disclosure may be used synonymously with each other.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet conveyor comprising:

a heating device configured to heat a recording medium being conveyed, the heating device including, a heater including a base and a heat source, a first temperature sensor configured to detect a temperature of the heater, and a second temperature sensor configured to detect the temperature of the heater;

a recording medium sensor configured to detect the recording medium; and processing circuitry configured to determine a direction of displacement of the recording medium based on a detection result of the recording medium sensor and the detected temperature of the first temperature sensor, the heater having, a first heat-distribution amount region on a first side in a conveyance orthogonal direction with respect to a reference position, and a second heat-distribution amount region on a second side in the conveyance orthogonal direction with respect to the reference position, the conveyance orthogonal direction being orthogonal to a conveyance direction in which the recording medium is conveyed and parallel to a surface of the recording medium, the reference position being a center position in the conveyance orthogonal direction of the heat source, the second heat-distribution amount region greater in a heat distribution amount than the first heat-distribution amount region, the first temperature sensor farther from the reference position than the second temperature sensor in the conveyance orthogonal direction, the first temperature sensor being the only temperature sensor in the first heat-distribution amount region, and the recording medium sensor in the second heat-distribution amount region.

2. The sheet conveyor according to claim 1, wherein a length of the second heat-distribution amount region from the reference position to an end on the first side of the base in the conveyance orthogonal direction is shorter than a length of the first heat-distribution amount region from the reference position to an end on the second side of the base in the conveyance orthogonal direction.

3. The sheet conveyor according to claim 1, wherein the heater further includes a power supply line and an electrode on the base; and an area including the heat source, the power supply line, and the electrode in the second heat-distribution amount region is larger than another area including the heat source, the power supply line, and the electrode in the first heat-distribution amount region.

4. The sheet conveyor according to claim 1, wherein the recording medium sensor is upstream from the heater on a conveyance passage of the recording medium in a conveyance direction of the recording medium.

5. The sheet conveyor according to claim 4, further comprising:

a recording medium feeder configured to feed the recording medium into the conveyance passage, wherein the recording medium sensor is included in the recording medium feeder.

6. An image forming apparatus comprising the sheet conveyor according to claim 1.

7. The image forming apparatus according to claim 6, wherein the heating device includes a rotator that does not include a rubber layer.

8. A sheet conveyor comprising:

a heating device configured to heat a recording medium being conveyed, the heating device including, a heater including a base, a heat source, a rotator, and a pressure member including an elastic layer and pressing the rotator, a first temperature sensor configured to detect a temperature of the heater, and a second temperature sensor configured to detect the temperature of the heater;

a recording medium sensor configured to detect the recording medium; and processing circuitry configured to determine a direction of displacement of the recording medium based on a detection result of the recording medium sensor and the detected temperature of the first temperature sensor, the heater having, a first heat-distribution amount region on a first side in a conveyance orthogonal direction with respect to a reference position of the elastic layer, and a second heat-distribution amount region on a second side in the conveyance orthogonal direction with respect to the reference position of the elastic layer, the conveyance orthogonal direction being orthogonal to a conveyance direction in which the recording medium is conveyed and parallel to a surface of the recording medium, the reference position of the elastic layer being a center position in the conveyance orthogonal direction of the elastic layer, the second heat-distribution amount region being greater in a heat distribution amount than the first heat-distribution amount region, the first temperature sensor farther from the reference position of the elastic layer than the second temperature sensor in the conveyance orthogonal direction, the first temperature sensor being the only temperature sensor in the first heat-distribution amount region, and the recording medium sensor in the second heat-distribution amount region.

9. The sheet conveyor according to claim 8, wherein a length of the second heat-distribution amount region from the reference position of the elastic layer to an end on the first side of the base in the conveyance orthogonal direction is shorter than a length of the first heat-distribution amount region from the reference position of the elastic layer to an end on the second side of the base in the conveyance orthogonal direction.

10. The sheet conveyor according to claim 8, wherein the second heat-distribution amount region is shorter in the conveyance orthogonal direction of the heat source from the reference position of the elastic layer, than is the first heat-distribution amount region.

11. The sheet conveyor according to claim 8, wherein the heater further includes a power supply line and an electrode on the base; and an area including the heat source, the power supply line, and the electrode in the second heat-distribution amount region is larger than another area including the heat source, the power supply line, and the electrode in the first heat-distribution amount region.

12. The sheet conveyor according to claim 8, wherein the recording medium sensor is upstream from the heater on a conveyance passage of the recording medium in a conveyance direction of the recording medium.

13. The sheet conveyor according to claim 12, further comprising:

a recording medium feeder configured to feed the recording medium into the conveyance passage, wherein the recording medium sensor is included in the recording medium feeder.

14. An image forming apparatus comprising the sheet conveyor according to claim 8.

15. The image forming apparatus according to claim 14, wherein the heating device includes a rotator that does not include a rubber layer.

16. A sheet conveyor comprising:

a heating device configured to heat a recording medium being conveyed, the heating device including, a heater including a base and a heat source, a first temperature sensor configured to detect a temperature of the heater, and a second temperature sensor configured to detect the temperature of the heater;

a recording medium sensor configured to detect the recording medium; and processing circuitry configured to determine a direction of displacement of the recording medium based on a detection result of the recording medium sensor and the detected temperature of the first temperature sensor, the heater having, a first heat-distribution amount region on a first side in a conveyance orthogonal direction with respect to a reference position of the recording medium, and a second heat-distribution amount region on a second side in the conveyance orthogonal direction with respect to the reference position of the recording medium, the conveyance orthogonal direction being orthogonal to a conveyance direction in which the recording medium is conveyed and parallel to a surface of the recording medium, the reference position of the recording medium being a center position in the conveyance orthogonal direction of the recording medium to be conveyed, the second heat-distribution amount region being greater in a heat distribution amount than the first heat-distribution amount region, the first temperature sensor farther from the reference position of the recording medium than the second temperature sensor in the conveyance orthogonal direction, the first temperature sensor being the only temperature sensor in the first heat-distribution amount region, and the recording medium sensor in the second heat-distribution amount region.

17. The sheet conveyor according to claim 16, wherein a length of the second heat-distribution amount region from the reference position of the recording medium to an end on the first side of the base in the conveyance orthogonal direction is shorter than a length of the first heat-distribution amount region from the reference position of the recording medium to an end on the second side of the base in the conveyance orthogonal direction.

18. The sheet conveyor according to claim 16, wherein the heater further includes a power supply line and an electrode on the base; and an area including the heat source, the power supply line, and the electrode in the second heat-distribution amount region is larger than another area including the heat source, the power supply line, and the electrode in the first heat-distribution amount region.

19. The sheet conveyor according to claim 16, further comprising:

a recording medium feeder configured to feed the recording medium into a conveyance passage of the recording medium in a conveyance direction of the recording medium, wherein the recording medium sensor is included in the recording medium feeder.

20. An image forming apparatus comprising the sheet conveyor according to claim 16.

* * * * *